(12) United States Patent
Kim et al.

(10) Patent No.: US 12,045,540 B2
(45) Date of Patent: Jul. 23, 2024

(54) AUDIO DEVICE FOR PROCESSING AUDIO DATA AND OPERATION METHOD THEREOF

(71) Applicant: Samsung Electronics Co., Ltd., Gyeonggi-do (KR)

(72) Inventors: Sanghyeok Kim, Gyeonggi-do (KR); Sangeun Kim, Gyeonggi-do (KR); Kyoungho Bang, Gyeonggi-do (KR); Soonho Baek, Gyeonggi-do (KR); Beakkwon Son, Gyeonggi-do (KR); Jaemo Yang, Gyeonggi-do (KR); Gunwoo Lee, Gyeonggi-do (KR); Dong Yi, Gyeonggi-do (KR); Gupil Cheong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/573,829

(22) Filed: Jan. 12, 2022

(65) Prior Publication Data

US 2022/0222036 A1    Jul. 14, 2022

Related U.S. Application Data

(63) Continuation of application No. PCT/KR2022/000164, filed on Jan. 5, 2022.

(30) Foreign Application Priority Data

Jan. 13, 2021    (KR) ........................ 10-2021-0004888

(51) Int. Cl.
*G06F 3/16*      (2006.01)
*H04R 3/00*     (2006.01)
*H04R 29/00*    (2006.01)

(52) U.S. Cl.
CPC ............... *G06F 3/165* (2013.01); *H04R 3/00* (2013.01); *H04R 29/004* (2013.01)

(58) Field of Classification Search
CPC .. G06F 3/165; G10L 21/0216; H04R 2499/11
See application file for complete search history.

(56) References Cited

U.S. PATENT DOCUMENTS

| 10,217,475 B2 | 2/2019 | Lee et al. |
| 2006/0120540 A1* | 6/2006 | Luo ...................... H04R 25/407 381/98 |

(Continued)

FOREIGN PATENT DOCUMENTS

| CN | 106303804 A | 1/2017 |
| CN | 110166879 A | 8/2019 |

(Continued)

OTHER PUBLICATIONS

International Search Report dated Apr. 20, 2022.
Written Opinion dated Apr. 20, 2022.
Extended European Search Report dated Apr. 23, 2024 11 pages.

*Primary Examiner* — Ping Lee
(74) *Attorney, Agent, or Firm* — Cha & Reiter, LLC

(57) ABSTRACT

An audio device and method are disclosed. The audio device includes a microphone, a communication circuit, and a processor. The processor implements the method, including: establishing a communication link with an electronic device via the communication circuit, transmitting information related to the communication link to an external audio device via the communication circuit, detecting a first level of noise included in a first audio data collected via the at least one microphone, identifying a second level of noise of the external audio device, when the first level of noise satisfies a predesignated first condition, and controlling the external audio device to transmit second audio data collected by the external audio device to the electronic device, when (Continued)

the second level of noise of the external audio device meets a predesignated second condition different from the predesignated first condition.

20 Claims, 13 Drawing Sheets

(56) References Cited

U.S. PATENT DOCUMENTS

| | | |
|---|---|---|
| 2008/0175399 A1 | 7/2008 | Kim et al. |
| 2014/0369516 A1 | 12/2014 | Rhee |
| 2015/0245129 A1 | 8/2015 | Dusan et al. |
| 2015/0249892 A1 | 9/2015 | Kuhnel et al. |
| 2018/0092588 A1 | 4/2018 | Tzvieli et al. |
| 2020/0219525 A1 | 7/2020 | Moon et al. |
| 2020/0252993 A1 | 8/2020 | Srivastava et al. |
| 2020/0265838 A1 | 8/2020 | Lee et al. |
| 2020/0342869 A1 | 10/2020 | Lee et al. |
| 2022/0167084 A1 | 5/2022 | Yang |

FOREIGN PATENT DOCUMENTS

| | | |
|---|---|---|
| CN | 111741401 A | 10/2020 |
| KR | 10-0892095 B1 | 4/2009 |
| KR | 10-2014-0145401 A | 12/2014 |
| KR | 10-2019-0042903 A | 4/2019 |
| KR | 10-2019-0042918 A | 4/2019 |
| KR | 10-1963736 B1 | 7/2019 |
| KR | 10-2020-0085030 A | 7/2020 |
| WO | 2020/258570 A1 | 12/2020 |

\* cited by examiner

AUDIO DEVICE FOR PROCESSING AUDIO DATA AND OPERATION METHOD THEREOF

CROSS-REFERENCE TO RELATED APPLICATION

This application is a continuation of International Application No. PCT/KR2022/000164 filed on Jan. 5, 2022 which is based on and claims priority under 35 U.S.C. § 119 to Korean Patent Application No. 10-2021-0004888, filed on Jan. 13, 2021, in the Korean Intellectual Property Office, the disclosure of which is incorporated by reference herein in its entirety.

TECHNICAL FIELD

Certain embodiments of the disclosure relate to a device and a method for processing audio data in an audio device.

BACKGROUND

With the development of information communication technology and semiconductor technology, various electronic devices have developed as multimedia devices capable of providing a variety of multimedia functions. The multimedia functions may include at least one of a voice call function, a video call function, a message function, a broadcasting function, a wireless Internet function, a camera function, an electronic payment function, or a content reproducing function.

An electronic device can enhance the useability of these multimedia functions by interoperating with at least one other electronic device. For example, the electronic device may output audio data (e.g., a voice and/or music) to at least one external audio device.

When multiple audio devices (e.g., earphone devices) are utilized together, each audio device may be set to operate within a particular predefined role. For example, while establishing communication between the audio devices, the audio devices may determine a role of each audio device, such as a main device (e.g., a primary device, primary equipment, or a primary earbud) having an authority to control communication for the audio devices, and an auxiliary device (e.g., a secondary device, secondary equipment, or a secondary earbud) which operates according to control instructions from the main device.

The multiple audio devices may output audio data received from an external device (e.g., an electronic device) through each speaker. For example, when the audio devices includes earphones, and present executed functions include a call function and a music playback function, audio data (e.g., a voice and/or music) received from the external device (e.g., the electronic device) may be output through each speaker.

The multiple audio devices may collect audio data for transmission to the external audio device (e.g., the electronic device) using a first audio device configured as a primary device. For example, when a user wears earbuds for performing calls, voice recording, or voice commands, audio data collected through a microphone of the first audio device, preconfigured as a primary device, may be transmitted to the external device (e.g., the electronic device).

When noise is concentrated in a first direction in which the first audio device is worn, the multiple audio devices may experience deterioration in the audio data quality, as the noise picked up through the microphone of the first audio device.

SUMMARY

Certain embodiments of the disclosure may disclose a device and a method for processing audio data in an audio device.

According to certain embodiments, an audio device may include at least one microphone, a communication circuit, and at least one processor operatively connected to the at least one microphone and the communication circuit. The processor is configured to: establish a communication link with an electronic device via the communication circuit, transmit information related to the communication link to an external audio device via the communication circuit, detect a first level of noise included in a first audio data collected via the at least one microphone, identify a second level of noise of the external audio device, when the first level of noise satisfies a predesignated first condition, and controlling the external audio device to transmit second audio data collected by the external audio device to the electronic device, when the second level of noise of the external audio device meets a predesignated second condition different from the predesignated first condition.

According to certain embodiments, an operation method of an audio device may include establishing, via a communication circuit of the audio device, a communication link with an electronic device, transmitting, via the communication circuit, information related to the communication link to an external audio device, detecting, via at least one processor, a first level of noise included in a first audio data collected via at least one microphone of the audio device, identifying a second level of noise of the external audio device, when the first level of noise meets a predesignated first condition, and controlling the external audio device to transmit second audio data collected by the external audio device to the electronic device when the second level of noise of the external audio device meets a predesignated second condition different from the predesignated first condition.

Advantageous Effects of Invention

According to certain embodiments of the disclosure, when an audio device is linked with an external audio device and provides audio data collected through a microphone to an electronic device, the audio device may switch roles when detecting introduction of noise to the audio device and the external audio device. Thus, the overall quality of recorded audio data can be enhanced.

DETAILED DESCRIPTION

Hereinafter, various example embodiments will be described in greater detail with reference to the figures.

Figure 1:
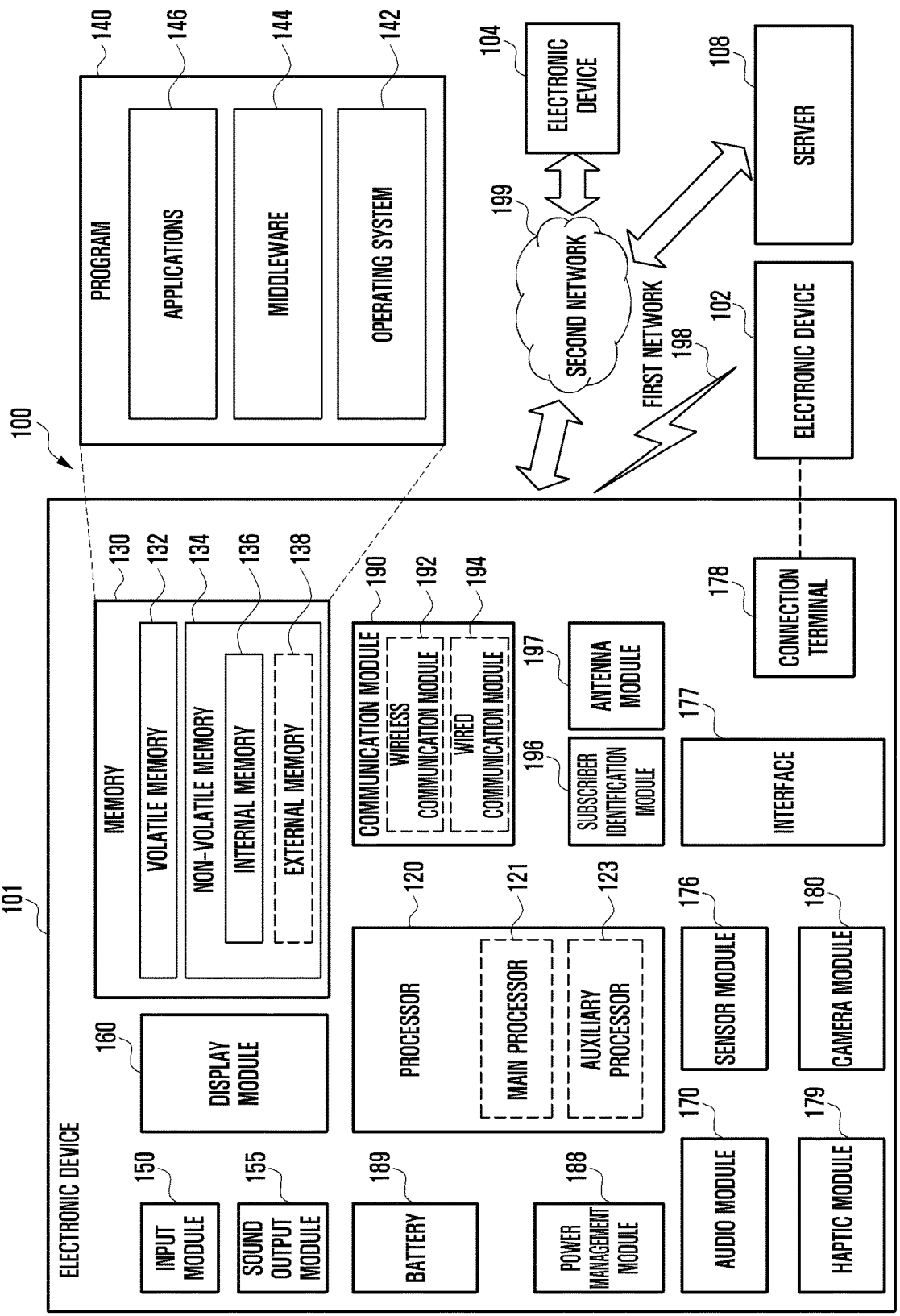
FIG. 1 is a block diagram of an electronic device in a network environment according to certain embodiments.

FIG. 1 is a block diagram illustrating an example electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In certain embodiments, at least one of the components (e.g., the connecting terminal 178) may be omitted from the electronic device 101, or one or more other components may be added in the electronic device 101. In certain embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device.

The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with certain embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
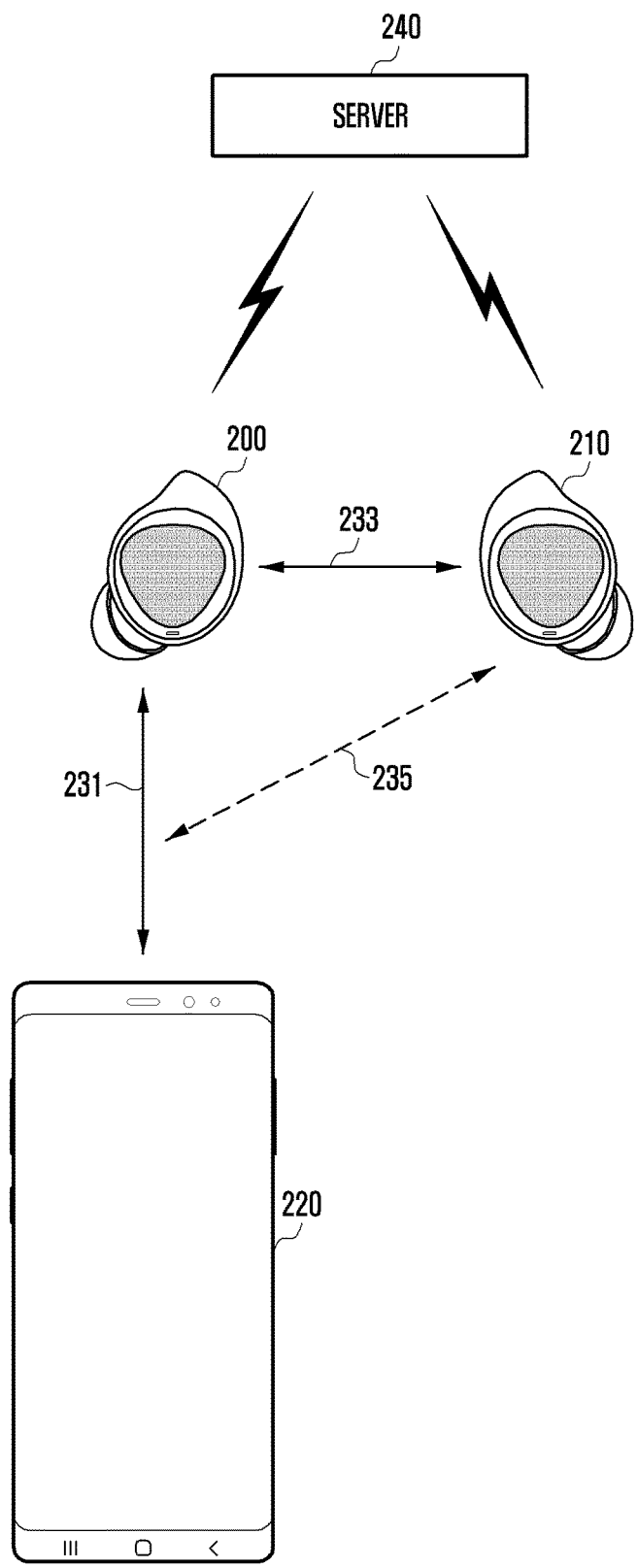
FIG. 2 illustrates an example of a wireless communication system for providing a network of an audio device and an electronic device according to certain embodiments.

FIG. 2 illustrates an example of a wireless communication system for providing a network of an audio device and an electronic device according to certain embodiments. According to an embodiment, an audio device 200, an external audio device 210, and/or an electronic device 220 of FIG. 2 may be at least partially similar to the electronic device 101 of FIG. 1, or may further include other embodiments of an electronic device.

According to certain embodiments referring to FIG. 2, the audio devices 200 and 210 and the electronic device 220 may perform communication based on at least one wireless network. For example, the audio devices may be an accessory device including a set of multiple audio devices 200 and 210, such as a pair of earphones. For example, when the multiple audio devices 200 and 210 are a set, the audio devices 200 and 210 may be paired in advance, and/or information related to their respective addresses may be prestored. For example, the electronic device 220 may include a user terminal such as a smartphone, a tablet PC, a desktop computer, or a laptop computer. For example, the wireless network may include at least one of a wireless LAN, Bluetooth low energy (BLE), an ultra-wideband (UWB), or infrared communication.

According to certain embodiments, the electronic device 220 may transmit a data packet including a content such as text, a voice, an image, or a video to the audio devices 200 and 210. According to an embodiment, according to the type of content included in the data packet, not only the electronic device 220 but also at least one audio device 200 and/or 210 of the audio devices 200 and 210 may transmit a data packet. For example, when the electronic device 220 reproduces a music content, the electronic device 220 may transmit a data packet including the music content to the audio devices 200 and 210. In another example, when the electronic device 220 performs a call function, not only the electronic device 220 but also at least one audio device 200 and/or 210 of the audio devices 200 and 210 may transmit a data packet including a content (e.g., voice data or audio data) to the electronic device 220.

According to certain embodiments, when the electronic device 220 generates (creates or establishes) multiple communication links with multiple audio devices 200 and 210 for transmission of a data packet, resource consumption and power consumption of the electronic device 220 may increase. Accordingly, the electronic device 220 may form a first communication link 231 with the audio device 200 among the multiple audio devices 200 and 210 to transmit a data packet via the first communication link 231. The external audio device 210 may monitor (235) the first communication link 231 to receive the data packet including a content. For example, the first communication link 231 may be established based on a first wireless network. For example, the first wireless network may include at least one of a wireless LAN, Bluetooth, BLE, or infrared communication. For example, the electronic device 220 may be referred to as a device under test (DUT), the audio device 200 may be referred to as a main device (e.g., a primary device, primary equipment, or a primary earbud), and the external audio device 210 may be referred to as an auxiliary device (e.g., a secondary device, secondary equipment, or a secondary earbud).

According to certain embodiments, the audio device 200 and the external audio device 210 may be communicatively connected to each other based on a second wireless network. According to an embodiment, the audio device 200 and the external audio device 210 may generate a second communication link 233 based on the second wireless network. For example, the second wireless network may be identical to the first wireless network, or include at least one of a wireless LAN, Bluetooth, BLE, UWB, or infrared communication, as a network different from the first wireless network.

According to certain embodiments, the audio device 200 and the external audio device 210 may share information related to the first communication link 231 with each other through the second communication link 233. According to an embodiment, the audio device 200 and the external audio device 210 may configure a role of each audio device in operation of performing communicative connection. When the audio device 200 is configured as a "primary" device, the audio device 200 may transmit information related to the first communication link 231 to the external audio device 210 via a second communication link 233. For example, the information associated with the first communication link 231 may include at least one of address information (e.g., at least one of a Bluetooth address or a logical transport (LT) address), clock information (e.g., at least one of a Bluetooth piconet clock or a Master's CLKN), channel information (e.g., a used channel map), service discovery protocol (SDP) result information, information relating to a supported function (e.g., a supported feature), key information (e.g., a Bluetooth link key), or an extended inquiry response (EIR) packet.

According to an embodiment, when supporting the same user account or a similar user account (e.g., a family account), the audio device 200 and the external audio device 210 may share information related to the first communication link 231 with each other through an external device (e.g., an external server 240) interworking with the audio device 200 or the external audio device 210 through the user account. For example, when the audio device 200 communicates with the external server 240, the audio device 200 may transmit the information related to the first communication link 231 to the external server 240. When the external audio device 210 communicates with the external server 240, the external audio device 210 may receive the information related to the first communication link 231 from the external server 240.

According to an embodiment, the external audio device 210 may share information related to the first communication link 231 with the electronic device 220. For example, the electronic device 220 may transmit the information related to the first communication link 231 to the external audio device 210 via a separate link (not shown). For example, the separate link (not shown) may be released when transmission of the information related to the first communication link 231 is completed. In another example, the electronic device 220 may transmit the information related to the first communication link 231 to the external server 240. When the external audio device 210 can communicate with the external server 240, the external audio device 210 may receive the information related to the first communication link 231 via the external server 240.

According to certain embodiments, when the audio device 200 is configured as a primary device, the audio device 200 may transmit and/or receive audio data to or from the electronic device 220 via the first communication link 231. According an embodiment, the audio device 200 may output audio data, based on the information received via the first communication link 231, from the electronic device 220 to an external environment through at least one speaker of the audio device 200. According to an embodiment, the audio device 200 may transmit, to the electronic device 220 via the first communication link 231, audio data collected based on at least one communication parameter related to the first communication link 231 through at least one microphone of the audio device 200.

According to certain embodiments, when the external audio device 210 is configured as a secondary device, the external audio device 210 may monitor (e.g., shadow) (235) the first communication link 231, based on the information related to the first communication link 231. According to an embodiment, the external audio device 210 may retrieve, based on the information passing through the first communication link 231, a data packet including a content from the electronic device 220 without generating a communication link with the electronic device 220. For example, the external audio device 210 may acquire audio data transmitted based on the information related to the first communication link 231 by the electronic device 220 via the first communication link 231. The external audio device 210 may determine a hopping channel (or a frequency hopping channel) of the first communication link 231 through address information and clock information, and may decrypt a data packet encrypted through key information. The external audio device 210 may output audio data to the outside through at least one speaker of the external audio device 210, the audio data being acquired by decrypting the data packet. For example, the external audio device 210 and the audio device 200 may perform, based on time information synchronized with the audio device 200, substantially simultaneous output of the audio data acquired via the first communication link 231.

According to certain embodiments, the audio device 200 may switch roles with the external audio device 210, based on the intensity of noise introduced into the audio device 200 and the external audio device 210. According to an embodiment, when the intensity of noise detected through a microphone of the audio device 200 satisfies a first reference level within a first time interval, the audio device 200 may transmit a noise level request signal to the external audio device 210. For example, meeting the first reference level may include a state in which the intensity of noise detected through the microphone of the audio device 200 exceeds the first reference level. For example, when the audio device 200 includes multiple microphones, the intensity of noise detected through the microphone of the audio device 210 may include at least one of an average of intensity of noise detected through multiple microphones, an average of intensity of noise detected through at least one microphone having a relatively lower intensity of noise among multiple microphones, an average of intensity of noise detected through at least one microphone having a relatively higher intensity of noise among multiple microphones, the highest intensity of noise among intensities of noise detected through multiple microphones, or the lowest intensity of noise among intensities of noise detected through multiple microphones. The audio device 200 may identify, based on the noise level request signal, whether the intensity of noise detected through a microphone of the external audio device 210 satisfies a second reference level for a second time interval that is different from the first time interval. When the intensity of noise detected through the microphone of the external audio device 210 satisfies a second reference level that is different from the first reference level for a second time interval, the audio device 200 may determine that the role of the audio device 200 is switched with that of the external audio device 210. For example, meeting the second reference level may include a state in which the intensity of noise detected through the microphone of the external audio device 210 is equal to or lower than the second reference level. For example, when the external audio device 210 includes multiple microphones, the intensity of the noise detected through the microphone of the external audio device 210 may include at least one of an average of intensity of noise detected through multiple microphones, an average of intensity of noise detected through at least one microphone having a relatively lower intensity of noise among multiple microphones, an average of intensity of noise detected through at least one microphone having a relatively higher intensity of noise among multiple microphones, the highest intensity of noise among intensities of noise detected through multiple microphones, or the lowest intensity of noise among intensities of noise detected through multiple microphones. For example, the first reference level and/or the second reference level may be configured during second link establishment of the audio device 200 and the external audio device 210. In another example, the audio device 200 may configure the first reference level, based on the intensity of noise detected through the microphone of the audio device 210 for a designated time interval. The external audio device 210 may configure the second reference level, based on the intensity of noise acquired through the microphone of the external audio device 210 for a designated time interval. The audio device 200 and the external audio device 210 may share information related to the first reference level and/or the second reference level.

According to an embodiment, the audio device 200 may determine, based on noise introduced into the audio device 200 and the external audio device 210, the direction of a signal introduced into the audio device 200 and/or 210. When the audio device 200 determines, based on the direction of a signal, that noise is concentrated in the audio device 200, the audio device 200 may determine to switch the role with the external audio device 210.

According to certain embodiments, when the role of the external audio device 210 is switched to a primary device by the audio device 200, the external audio device 210 may be set to transmit and/or receive, based on the information related to the first communication link 231, audio data to or from the electronic device 220. According to an embodiment, the external audio device 210 may output audio data to the external environment through at least one speaker of the external audio device 210, the audio data being received based on the information related to the first communication link 231 from the electronic device 220. According to an embodiment, the external audio device 210 may transmit audio data to the electronic device 220, the audio data being collected based on the information related to the first communication link 231 through at least one microphone of the external audio device 210.

According to certain embodiments, when the audio device operates as a "secondary" device through the role switching with the external audio device 210, the audio device 200 may monitor the first communication link 231 (now established between the electronic device 220 and the external audio device 210), based on the information related to the first communication link 231. According to an embodiment, when the audio device 200 operates as a secondary device, the audio device 200 may perform monitoring (e.g., "shadowing" as described above) based on the information related to the first communication link 231 to acquire audio data transmitted by the electronic device 220 through the first communication link 231, without having an established connection thereof. The audio device 200 may output the audio data acquired through the monitoring to the outside through at least one speaker of the audio device 200. According to an embodiment, when the audio device 200 operates as a secondary device, based on the role switching with the external audio device 210, the audio device 200 may not transmit audio data received through the microphone of the audio device 200 to the electronic device 220. According to an embodiment, when the audio device 200 operates as a secondary device, based on the role switching with the external audio device 210, the audio device 200 may continuously or periodically identify the state (e.g., a residual amount of a battery and/or the intensity of noise detected through a microphone) of the audio device 200.

Figure 3:
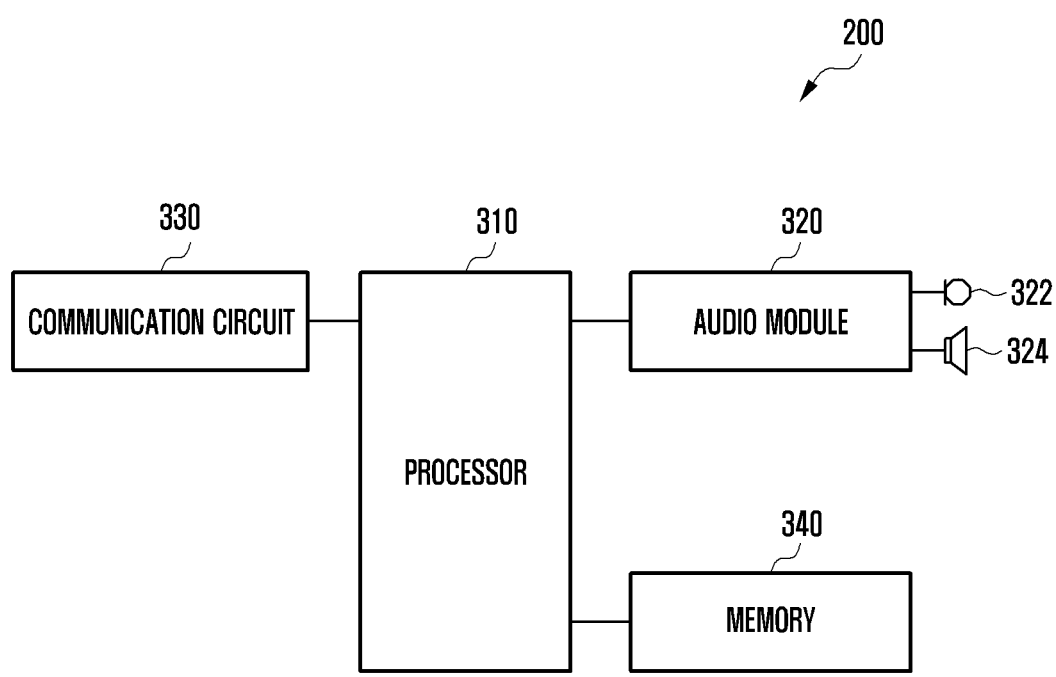
FIG. 3 is a block diagram of an audio device for processing audio data according to certain embodiments.

FIG. 3 is a block diagram of an audio device for processing audio data according to certain embodiments. According to an embodiment, an audio device 200 of FIG. 3 may be at least partially similar to the electronic device 101 of FIG. 1, or may include other embodiments of an audio device.

According to certain embodiments referring to FIG. 3, the audio device 200 may include a processor 310 (e.g., the processor 120 of FIG. 1), an audio module 320 (e.g., the audio module 170 of FIG. 1), a microphone 322 (e.g., the input module 150 of FIG. 1), a speaker 324 (e.g., the sound output module 155 of FIG. 1), a communication circuit 330 (e.g., the wireless communication module 192 of FIG. 1), and/or a memory 340 (e.g., the memory 130 of FIG. 1). In FIG. 3, description is made based on elements of the audio device 200, but the external audio device 210 may include substantially the same elements as an audio device 200.

According to certain embodiments, the processor 310 may control the audio module 320, the communication circuit 330, and/or the memory 340, which are operatively connected to the processor 310. According to an embodiment, the processor 310 may include an application processor (AP) and/or a communication processor (CP).

According to certain embodiments, the processor 310 may control the communication circuit 330 to establish, based on a second wireless network, a communication link (e.g., the second communication link 233 of FIG. 2) with the external audio device 210. According to an embodiment, the processor 310 may configure a role of the audio device 200 and/or the external audio device 210 in an operation of establishing a communication link with the external audio device 210. For example, the processor 310 may configure, through a negotiation with the external audio device 210, the audio device 200 as a primary device (e.g., PE) having a right to control a communication link related to the audio device 200. In another example, the processor 310 may configure the external audio device 210 as a secondary device (e.g., SE) through a negotiation with the external audio device 210. For example, the communication link related to the audio device 200 may include a first communication link 231 between the audio device 200 and the electronic device 220 and/or a second communication link 233 between the audio device 200 and the external audio device 210.

According to certain embodiments, when the audio device 200 is configured as a primary device (e.g., PE), the processor 310 may control the communication circuit 330 to establish a communication link (e.g., the first communication link 231 of FIG. 2) with the electronic device 220 through a first wireless network. According to an embodiment, when receiving, through the communication circuit 330, a signal (e.g., an advertising signal) generated by the electronic device 220, the processor 310 may determine that the electronic device 220 is adjacent to the audio device 200. When the processor 310 determines that the electronic device 220 is adjacent to the audio device 200, the processor may establish a communication link with the electronic device 220. According to an embodiment, the processor 310 may configure information related to a communication link with the electronic device 220, through a negotiation with the electronic device 220. For example, the information related to the communication link with the electronic device 220 may include at least one communication parameter for transmitting and/or receiving audio data (or voice data) by the audio device 200 and the electronic device 220. For example, when establishing the communication link with the electronic device 220, the processor 310 may select, based on a codec list shared with the electronic device 220, a codec to be used for transmission and/or reception of audio data to or from the electronic device 220. For example, when using a synchronous protocol (e.g., eSCO), the processor 310 may configure at least one of an LT address, a packet type, a packet length, a transmission period (or a transmission interval) (e.g., $T_{eSCO}$) of audio data, a retransmission interval (e.g., $W_{eSCO}$), or information (e.g., $D_{eSCO}$) related to a synchronous configuration through negotiation with the electronic device 220. For example, the processor 310 may identify a channel resource (e.g., a frequency hopping channel) for transmission and/or reception of audio data generated based on a clock of a master device (e.g., the electronic device 220).

According to certain embodiments, the processor 310 may control the communication circuit 330 to share the information related to the communication link (e.g., the first communication link 231 of FIG. 2) with the electronic device 220 with the external audio device 210. According to an embodiment, the processor 310 may control the communication circuit 330 to transmit the information related to the communication link (e.g., the first communication link 231 of FIG. 2) with the electronic device 220 to the external audio device 210. According to an embodiment, when the audio device 200 and the external audio device 210 can communicate with the external server 240, the processor 310 may control the communication circuit 330 to transmit the information related to the communication link (e.g., the first communication link 231 of FIG. 2) with the electronic device 220 to the audio device 210 through the external server 240.

According to certain embodiments, when the processor 310 is configured as a primary device, the processor 310 may transmit and/or receive audio data to or from the electronic device 220. According to an embodiment, when the processor 310 is linked with the electronic device 220 and provides a call function, the processor 310 may transmit and/or receive audio data with the electronic device 220 through the communication circuit 330. According to an embodiment, the processor 310 may control the audio module 320 to output, to the outside through a speaker 324, audio data received based on the information related to the communication link (e.g., the first communication link 231 of FIG. 2) with the electronic device 220 from the electronic device 220. According to an embodiment, the processor 310 may control the communication circuit 330 to transmit, to the electronic device 220, audio data collected based on the information related to the communication link (e.g., the first communication link 231 of FIG. 2) with the electronic device 220 through a microphone 322.

According to certain embodiments, the processor 310 may detect noise introduced through the microphone 322. According to an embodiment, when the processor 310 is linked with the electronic device 220 and provides a call function, the processor 310 may identify noise introduced through a microphone 322 at a designated period. For example, when the designated period arrives, the processor 310 may separate noise from audio data (or an audio signal) introduced into the audio device 200 through the microphone 322. The processor 310 may identify the intensity (e.g., a noise level) of the noise separated from the audio data. For example, when the audio device 200 includes multiple microphones, the intensity of the noise introduced through the microphone 322 may include at least one of an average of intensities of noise detected through multiple microphones, an average of intensities of noise detected through at least one microphone having a relatively lower intensity of noise among multiple microphones, an average of intensities of noise detected through at least one microphone having a relatively higher intensity of noise among multiple microphones, the highest intensity of noise among intensities of noise detected through multiple microphones, or the lowest intensity of noise among intensities of noise detected through multiple microphones.

According to certain embodiments, the processor 310 may determine, based on the noise detected through the microphone 322, whether to identify noise of the external audio device 210. According to an embodiment, when the intensity (e.g., a noise level) of noise detected through the microphone 322 satisfies a first reference level for a first time interval, the processor 310 may determine to identify noise of the external audio device 210 to determine whether to perform role switching. For example, the state satisfying the first reference level may include a state in which the intensity of noise detected through the microphone 322 exceeds the first reference level. For example, the state satisfying the first reference level for the first time interval may include a state in which the intensity of noise detected through the microphone 322 consecutively satisfies the first reference level by a designated number of times included the first time interval. According to an embodiment, when the intensity of noise detected through the microphone 322 before the first time interval arrives fails to satisfy the first reference level, the processor 310 may determine not to identify noise of the external audio device 210. When the processor 310 is to transmit audio data to the electronic device 220 or at a designated period, the processor 310 may identify again whether the intensity (e.g., noise level) of noise detected through the microphone 322 satisfies the first reference level for the first time interval. For example, the state of not satisfying the first reference level may include a state in which the intensity of the noise detected through the microphone 322 is equal to or lower than the first reference level. For example, the first time interval may be fixed. In another example, the first time interval may be changed based on the intensity of noise acquired through the microphone 322 or the state (e.g., a residual amount of a battery) of the audio device 200. For example, the length of the first time interval may be configured in proportion to the intensity of noise acquired through the microphone 322. In another example, the first time interval may be configured as a first length when the intensity of the noise acquired through the microphone 322 exceeds a fourth reference level, and may be configured as a second length that is relatively shorter than the first length when the intensity of the noise acquired through the microphone 322 is equal or lower than the fourth reference level. For example, the first reference level may be fixed. In another example, the first reference level may be changed based on the intensity of noise acquired through the microphone 322 for a designated time interval. In an example, the first reference level may be configured based on an average of intensities of noise acquired through the microphone 322 for a designated time interval.

According to certain embodiments, when the processor 310 determines to identify noise of the external audio device 210, the processor 310 may identify noise introduced into the external audio device 210. According to an embodiment, when the processor 310 determines to identify the noise of the external audio device 210, the processor 310 may periodically identify the noise detected from the external audio device 210.

According to an embodiment, when the processor 310 determines to identify noise of the external audio device 210, the processor 310 may control the communication circuit 330 to transmit a noise level request signal to the external audio device 210, based on a designated period for identification of the noise by the external audio device 210. For example, when the designated period for identification of the noise by the external audio device 210 arrives, the processor 310 may control the communication circuit 330 to transmit the noise level request signal to the audio device 210. In response to the request level request signal, the processor 310 may receive, from the external audio device 210, information related to the noise. For example, the information related to the noise may include at least one of the intensity (e.g., a noise level) of noise detected from the external audio device 210 or information related to a result of comparison between the intensity of noise detected from the external audio device 210 and a second reference level.

According to an embodiment, when the designated period for identification the noise by the external audio device 210 arrives, the processor 310 may detect the intensity of the noise detected through the microphone 322. For example, when the intensity (e.g., a noise level) of the noise detected through the microphone 322 satisfies the first reference level, the processor 310 may control the communication circuit 330 to transmit the noise level request signal to the external audio device 210. In response to the noise level request signal, the processor 310 may receive information related to the noise, from the external audio device 210. In another example, when the intensity (e.g., a noise level) of the noise detected through the microphone 322 fails to satisfy the first reference level, the processor 310 may restrict transmission of the noise level request signal to the external audio device 210.

According to an embodiment, when a role switch function is activated based on the noise detected through the microphone 322, the processor 310 may control the communication circuit 330 to transmit the noise level request signal to the external audio device 210. In response to the noise level request signal, the processor 310 may receive information related to the noise from the external audio device 210, through the communication circuit 330 at each period for identification of the noise by the external audio device 210. For example, the second reference level may include a noise level configured to be relatively lower than the first reference level. For example, the period for identification of the noise by the external audio device 210 may be identical to or different from a period for identification of the noise by the audio device 200.

According to certain embodiments, when the processor 310 determines to identify noise of the external audio device 210 to determine whether to perform role switching, the processor 310 may determine, based on the noise detected from the external audio device 210, whether to perform role switching with the external audio device 210. According to an embodiment, when the intensity of the noise detected from the external audio device 210 satisfies the second reference level for a second time interval, the processor 310 may determine to perform role switching with the external audio device 210. For example, the state satisfying the second reference level may include a state in which the intensity of the noise detected from the external audio device 210 is equal to or lower than the second reference level. For example, the state of satisfying the second reference level for the second time interval may include a state in which the intensity of the noise detected from the external audio device 210 consecutively satisfies the second reference level by a designated number of times included the second time interval. According to an embodiment, when the intensity of the noise detected from the external audio device 210 before the second time interval arrives fails to satisfy the second reference level, the processor 310 may determine not to switch the role with the external audio device 210. For example, the state of not satisfying the second reference level may include a state in which the intensity of the noise detected from the external audio device 210 exceeds the second reference level. For example, the second time interval may be fixed. In another example, the second time interval may be changed based on the intensity of noise detected from the external audio device 210 or the state (e.g., a residual amount of a battery) of the external audio device 210. For example, the length of the second time interval may be configured in proportion to the intensity of noise detected from the external audio device 210. In another example, the second time interval may be configured as a third length when the intensity of the noise detected from the external audio device 210 exceeds a fifth reference level, and may be configured as a fourth length that is relatively shorter than the third length when the intensity of the noise detected from the external audio device 210 is equal or lower than the fifth reference level. For example, the second reference level may be fixed. In another example, the second reference level may be changed based on the intensity of noise detected from the external audio device 210 for a designated time interval. In an example, the second reference level may be configured based on an average of intensities of noise detected from the external audio device 210 for a designated time interval.

According to certain embodiments, when the processor 310 determines to perform role switching with the external audio device 210, the processor 310 may perform a role switching procedure with the external audio device 210. For example, the role switching may include an operation of switching, from the audio device 200 to the external audio device 210, a device performing a role of transmitting audio data to the electronic device 220 via a communication link (e.g., the first communication link 231 of FIG. 2) with the electronic device 220. According to an embodiment, when the processor determines to perform role switching with the external audio device 210, the processor 310 may configure a role switch time point. The processor 310 may control the communication circuit 330 to transmit a role switch request signal including the role switch time point to the external audio device 210. When the role switch time point arrives, the processor 310 may switch the audio device 200 as a secondary device driven based on a control of the external audio device 210 configured as a primary device.

According to an embodiment, when the role of the audio device 200 is switched as a secondary device, the processor 310 may control the communication circuit 330 to monitor the first communication link 231 on the basis of the information related to the communication link (e.g., the first communication link 231 of FIG. 2) with the electronic device 220. The processor 310 may control the audio module 320 to output audio data acquired through monitoring to the outside through the speaker 324. According to an embodiment, when the role of the audio device 200 is switched as a secondary device, the processor 310 may control the communication circuit 330 not to transmit audio data collected through the microphone 322 to the electronic device 220.

According to certain embodiments, the audio module 320 may convert an audio signal collected through the microphone 322 into an electrical signal (e.g., audio data) and transmit the same to the processor 310. According to certain embodiments, the audio module 320 may convert an electrical signal received from the processor 310 into an audio signal and output the same through the speaker 324. For example, the electrical signal received from the processor 310 may be at least partially based on the audio data received from the electronic device 220 through the communication circuit 330.

According to certain embodiments, the microphone 322 may collect an audio signal generated around the audio device 200. According to an embodiment, the microphone 322 may include multiple microphones for collecting audio signals in different directions.

According to certain embodiments, the speaker 324 may output the audio signal to the outside. According to an embodiment, the speaker 324 may include multiple speakers oriented in different directions.

According to certain embodiments, the communication circuit 330 may support wireless communication with the external audio device 210 and/or the electronic device 220. According to an embodiment, the communication circuit 330 may transmit and/or receive audio data through a communication link (e.g., the first communication link 231 of FIG. 2) established with the electronic device 220. According to an embodiment, the communication circuit 330 may transmit and/or receive a signal (e.g., a noise level request signal or a role switch request signal) and/or data (e.g., information related to noise) through a communication link (e.g., the second communication link 233 of FIG. 2) established with the external audio device 210.

According to certain embodiments, the memory 340 may store various data used by at least one element (e.g., the processor 310, the audio module 320, or the communication circuit 330) included in the audio device 200. For example, the data may include a reference (e.g., the first reference level and/or the first time interval) for determining whether to identify noise of the external audio device 210, a reference (e.g., the second reference level and/or the second time interval) for determining whether to switch the role with the external audio device 210, or information related to the communication link with the electronic device 220. According to an embodiment, the memory 340 may store various instructions which can be executed through the processor 310.

According to certain embodiments, the audio device 200 may determine whether to perform role switching with the external audio device 210, based on the intensities of noise detected from the external audio device 210 and noise detected through the microphone 322. According to an embodiment, when the noise detected through the microphone 322 for the first time interval satisfies the first reference level, the processor 310 may identify the intensity of the noise of the external audio device 210, based on information related to the noise received, based on a designated period, from the external audio device 210.

According to an embodiment, when the intensity of the noise of the external audio device 210 is equal to or lower than the intensity of the noise detected through the microphone 322, the processor 310 may identify whether the intensity of the noise of the external audio device 210 satisfies the second reference level. For example, when the intensity of the noise of the external audio device 210 satisfies the second reference level for the second time interval, the processor 310 may determine to perform role switching with the external audio device 210. In another example, when the intensity of the noise detected from the external audio device 210 fails to satisfy the second reference level before the expiration of the designated second time interval, the processor 310 may determine not to perform role switching with the external audio device 210. According to an embodiment, when the intensity of the noise of the external audio device 210 is higher than the intensity of the noise detected through the microphone 322, the processor 310 may determine not to perform role switching with the external audio device 210. For example, the intensity of the noise detected through the microphone 322 may include at least one of the intensity of noise detected through the microphone 322 at a time point (e.g., a designated period) identical to or similar to a time point at which the external audio device 210 detects noise, an average of intensities of noise detected through the microphone 322 for the first time interval, or an average of intensities of noise detected through the microphone 322 for the first time interval and the second time interval. For example, the average of intensities of the noise may include at least one of an average of intensities of all noises measured for a designated time interval (e.g., the first time interval and/or the second time interval), an average of intensities of a designated number of noises each having a relatively high intensity of noise, or an average of intensities of noise remaining after excluding the maximum noise intensity and the minimum noise intensity.

According to certain embodiments, the audio device 200 may determine not to perform role switching, based on the noise detected through the microphone 322 in a state in which the intensity of the noise of the external audio device 210 is identified. According to an embodiment, the processor 310 may detect, based on a designated period, the noise through the microphone 322 while identifying the noise of the external audio device 210. The processor 310 may determine not to perform role switching when the intensity of the noise detected through the microphone 322 satisfies a third reference level relatively lower than the first reference level for a third time interval. For example, the processor 310 may determine that a call function can be provided through the microphone 322 of the audio device 200 and determine not to perform role switching with the external audio device 210. For example, the state satisfying the third reference level may include a state in which the intensity of the noise detected through the microphone 322 is equal to or lower than the third reference level. For example, the state satisfying the third reference level for the third time interval may include a state in which the intensity of the noise detected through the microphone 322 consecutively satisfies the third reference level by a designated number of times included in the third time interval. For example, when processor 310 determines not to perform role switching with the external audio device 210, the processor 310 may control the communication circuit 330 to transmit a noise level suspension signal to the external audio device 210. For example, when the intensity of the noise detected through the microphone 322 fails to satisfy the third reference level before the third time interval arrives, the processor 310 may determine, based on the intensity of the noise of the external audio device 210, whether to perform role switching with the external audio device 210. For example, the third time interval may be configured in the same manner as or a different manner from the second time interval, and may be configured based on the intensity of the noise acquired through the microphone 322 or the state (e.g., a residual amount of a battery) of the audio device 200. For example, the third reference level corresponds to a reference level for determining, based on the intensity of the noise introduced through the microphone 322, whether the microphone 322 can be used for a call function, and may configured in the same manner as or a different manner from the second reference level According to certain embodiments, the external audio device 210 may transmit the information related to the noise detected from the external audio device 210, to the audio device 200. According to an embodiment, the external audio device 210 may transmit, to the audio device 200, the information on the noise detected, based on the noise level request signal received from the audio device 200, through the microphone of the external audio device 210. According to an embodiment, when the external audio device 210 receives the noise level request signal from the audio device 200, the external audio device 210 may detect the noise through the microphone of the external audio device 210. The external audio device 210 may transmit a result of comparison between the noise detected through the microphone and the second reference level to the audio device 200.

According to certain embodiments, when the external audio device 210 is configured as a secondary device, the external audio device 210 may determine whether to perform role switching with the audio device 200. According to an embodiment, the external audio device 210 may detect the noise through the microphone of the external audio device 210, based on a designated period. When the external audio device 210 receives a noise request signal from the audio device 200, the external audio device 210 may determine that the intensity of the noise introduced through the microphone 322 of the audio device 200 is relatively high. In order to determine whether the microphone of the external audio device 210 can be used, the external audio device 210 may identify whether the intensity of the noise detected from the external audio device 210 satisfies the second reference level for the second time interval. When the intensity of the noise detected from the external audio device 210 satisfies the second reference level for the second time interval, the external audio device 210 may determine to perform role switching with the audio device 200. For example, when the external audio device 210 determines to perform role switching with the audio device 200, the external audio device 210 may transmit a role switch request signal to the audio device 200. For example, the role switch request signal may include information related to a role switch time point. According to an embodiment, when the intensity of the noise detected from the external audio device 210 fails to satisfy the second reference level for the second time interval, the external audio device 210 may determine not to perform role switching with the audio device 200. According to an embodiment, the audio device 200 may perform role switching based on the role switch request signal.

According to an embodiment, the external audio device 210 may detect, based on a designated period, the noise through the microphone of the external audio device 210. For example, when the intensity of the noise detected from the external audio device 210 satisfies the second reference level for the second time interval, the external audio device 210 may determine to perform role switching with the audio device 200. When the external audio device 210 determines to perform role switching with the audio device 200, the external audio device 210 may transmit a role switch request signal to the audio device 200. For example, the role switch request signal may include information related to a role switch time point. In another example, when the intensity of the noise detected from the external audio device 210 fails to satisfy the second reference level for the second time interval, the external audio device 210 may determine not to perform role switching with the audio device 200. According to an embodiment, when receiving the role switch request signal from the external audio device 210, the audio device 200 may identify whether the noise received through the microphone 322 of the audio device 200 satisfies the first reference level for the first time interval. For example, when the noise satisfies the first reference level for the first time interval, the audio device 200 may perform role switching based on the role switch request from the external audio device 210. In another example, when the noise fails to satisfy the first reference level for the first time interval, the audio device 200 may reject the role switch request from the external audio device 210.

According to certain embodiments, the external audio device 210 may transmit, to the audio device 200, the information related to the noise detected, based on a designated period, from the microphone of the external audio device 210. According to an embodiment, the designated period arrives, the external audio device 210 may transmit, to the audio device 200, information on the noise (e.g., a noise level) detected through the microphone of the external audio device 210. According to an embodiment, the external audio device 210 may transmit a result of comparison between the second reference level and the noise detected through the microphone of the external audio device 210 to the audio device 200.

According to an embodiment, when the noise of the external audio device 210 satisfies, based on the information on the noise received from the external audio device 210, the second reference level for the second time interval, the audio device 200 may identify the intensity of the noise detected through the microphone 322 of the audio device 200. When the intensity (e.g., a noise level) of the noise detected through the microphone 322 satisfies the first reference level for the first time interval, the audio device 200 may determine to perform role switching with the external audio device 210.

According to an embodiment, the intensity (e.g., a noise level) of the noise detected through the microphone 322 satisfies the first reference level for the first time interval, the audio device 200 may identify, based on the information on the noise periodically received from the external audio device 210, the intensity of the noise of the external audio device 210. When the intensity of the noise of the external audio device 210 satisfies the second reference level for the second time interval, the audio device 200 may determine to perform role switching with the external audio device 210.

According to certain embodiments, the external audio device 210 may detect the noise of the external audio device 210 through the microphone of the external audio device 210, based on a designated period. When the intensity (e.g., a noise level) of the noise of the external audio device 210 continuously satisfies the second reference level for a designated second time interval, the external audio device 210 may transmit state information of the microphone to the audio device 200. For example, the state information of the microphone may include at least one of information indicating that audio data is collectable using the microphone of the external audio device 210, or the intensity of the noise of the external audio device 210. For example, the intensity of the noise of the external audio device 210 may include an average of intensities of noise measured from the external audio device 210 for the second time interval, the maximum value of the intensity of the noise measured from the external audio device 210 for the second time interval, or the minimum value of the intensity of the noise measured from the external audio device 210 for the second time interval.

According to an embodiment, when receiving the state information of the microphone of the external audio device 210, the audio device 200 may identify the intensity of the noise detected through the microphone 322 of the audio device 200. When the intensity (e.g., a noise level) of the noise detected through the microphone 322 satisfies the first reference level for the first time interval, the audio device 200 may determine to perform role switching with the external audio device 210.

According to an embodiment, when receiving the state information of the microphone from the external audio device 210, the audio device 200 may identify the intensity of the noise detected through the microphone 322 of the audio device 200. When the intensity (e.g., a noise level) of the noise detected through the microphone 322 exceeds the intensity of the noise of the external audio device 210 for the first time interval and satisfies the first reference level, the audio device 200 may determine to perform role switching with the external audio device 210.

According to certain embodiments, the audio device 200 may determine whether to perform role switching, based on a difference between the noise intensity of the audio device 200 and the noise intensity of the external audio device 210. According to an embodiment, the audio device 200 may identify the intensity of noise (e.g., an average of intensities of noise) detected through the microphone 322 of the audio device 200 for a fourth time interval having a designated length. The audio device 200 may identify the intensity of noise (e.g., an average of intensities of noise) of the external audio device 210 for a fifth time interval having a designated length. For example, the fourth time interval and the fifth time interval may include non-overlapping time intervals having the same length.

According to an embodiment, the audio device 200 may detect a difference between the intensity of the noise detected from the audio device 200 for the fourth time interval and the intensity of the noise detected from the external audio device 210 for the fifth time interval. For example, when a difference between the intensity of the noise detected from the audio device 200 for the fourth time interval and the intensity of the noise detected from the external audio device 210 for the fifth time interval is greater than a designated reference interval or longer, the audio device 200 may determine to perform role switching with the external audio device 210. In another example, a difference between the intensity of the noise detected from the audio device 200 for the fourth time interval and the intensity of the noise detected from the external audio device 210 for the fifth time interval is smaller than a designated reference interval, the audio device 200 may determine not to perform role switching with the external audio device 210. In another example, when the intensity of the noise detected from the audio device 200 for the fourth time interval is lower than or equal to the intensity of the noise detected from the external audio device 210 for the fifth time interval, the audio device 200 may determine not to perform role switching with the external audio device 210.

According to certain embodiments, when the audio device 200 is configured as a primary device, the audio device 200 may transmit audio data collected through the microphone 322 to the electronic device 220. When receiving a retransmission request signal (e.g., a NACK signal) related to the audio data from the electronic device 220, the audio device 200 may perform role switching with the external audio device 210. When a retransmission interval arrives based on the role switching with the audio device 200, the external audio device 210 may transmit audio data collected through the microphone of the external audio device 210 to the electronic device 220.

According to an embodiment, the audio device 200 and the external audio device 210 may maintain the switched role even after the retransmission of the audio data is completed. For example, when the role of the external audio device 210 is switched as a primary device and a transmission interval of the audio data arrives, the external audio device 210 may transmit the audio data collected through the microphone of the external audio device 210 to the electronic device 220.

According to an embodiment, the audio device 200 and the external audio device 210 may perform role switching again once the retransmission of the audio data is completed. For example, when the retransmission of the audio data is completed, the role of the audio device 200 may be switched as a primary device.

According to certain embodiments, when performing role switching, the audio device 200 and the external audio device 210 may perform role switching again based on the quality of communication with the electronic device 220. According to an embodiment, when audio data transmission is consecutively performed by a designated number of times or more after the audio device 200 and the external audio device 210 perform role switching, the roles of the audio devices 200 and 210 may be switched again.

According to certain embodiments, the audio device 200 and the external audio device 210 may perform role switching based on the quality of communication with the electronic device 220. According to an embodiment, when the audio device 200 determines to perform role switching with the external audio device 210, based on the noise of the audio device 200 and the noise of the external audio device 210, the audio device 200 may identify the quality of communication with the electronic device 220. For example, when the audio device 200 determines that the quality of communication with the electronic device 220 satisfies a designated condition, the audio device 200 may determine not to perform role switching with the external audio device 210. For example, a state in which the quality of communication with the electronic device 220 satisfies a designated condition may include a state in which the quality of a call with the electronic device 220 exceeds a designated reference quality. In another example, when the audio device 200 determines that the quality of communication with the electronic device 220 fails to satisfy a designated condition, the audio device 200 may perform role switching with the external audio device 210. For example, a state in which the quality of communication with the electronic device 220 fails to satisfy a designated condition may include a state in which the quality of a call with the electronic device 220 is lower than or equal to a reference quality. For example, the quality of communication with the electronic device 220 may be configured based on the number of times of retransmission of audio data generated for a designated time interval.

Figure 4:
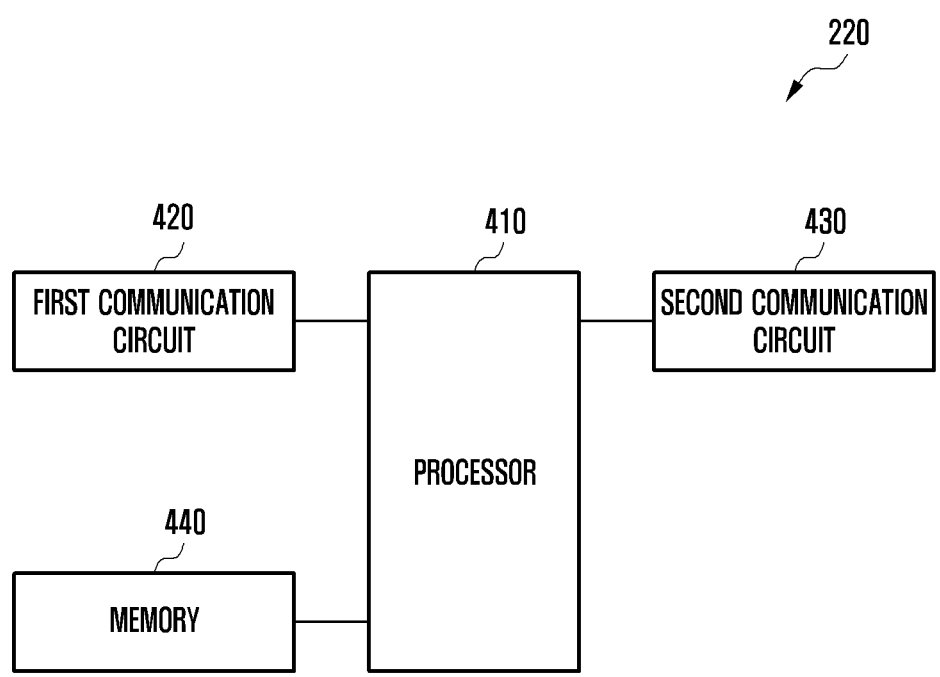
FIG. 4 is a block diagram of an electronic device for processing audio data according to certain embodiments.

FIG. 4 is a block diagram of an electronic device for processing audio data according to certain embodiments. According to an embodiment, an electronic device 220 of FIG. 4 may be at least partially similar to the electronic device 101 of FIG. 1 or may further include other embodiments of an electronic device.

According to certain embodiments referring to FIG. 4, the electronic device 220 may include a processor 410 (e.g., the processor 120 of FIG. 1), a first communication circuit 420 (e.g., the wireless communication module 192 of FIG. 1), a second communication circuit 430 (e.g., the wireless communication module 192 of FIG. 1), and/or a memory 440 (e.g., the memory 130 of FIG. 1).

According to certain embodiments, the processor 410 may control the first communication circuit 420, the second communication circuit 430, and/or the memory 440 operatively connected thereto. According to an embodiment, the processor 410 may include an application processor (AP) and/or a communication processor (CP).

According to certain embodiments, the processor 410 may control the second communication circuit 430 to perform communication based on a first wireless network with the audio device 200. For example, the first wireless network may include at least one of a wireless LAN, Bluetooth, BLE, UWB, or infrared communication. According to an embodiment, when the processor 410 establishes a communication link (e.g., the first communication link 231 of FIG. 2) with the audio device 200 through the second communication circuit 430, the processor 410 may configure information related to the communication link with the audio device 200 through negotiation with the audio device 200. For example, the processor 410 may generate a channel resource (e.g., a frequency hopping channel) for transmission and/or reception of audio data generated based on a clock of the electronic device 220. For example, the information related to the communication link with the audio device 200 may include at least one communication parameter for transmitting and/or receiving audio data (or voice data) by the audio device 200 and the electronic device 220. For example, at least one communication parameter related to the communication link with the audio device 200 may include at least one of a codec, an LT address, a packet type, a packet length, a transmission period (or a transmission interval) (e.g., $T_{eSCO}$) of audio data, a retransmission interval (e.g., $W_{eSCO}$), or information (e.g., $D_{eSCO}$) related to a synchronous configuration.

According to an embodiment, the processor 410 may share, with the external audio device 210, the information related to the communication link with the audio device 200. For example, the processor 410 may control the second communication circuit 430 to transmit information related to the communication link (e.g., the first communication link 231 of FIG. 2) with the audio device 200 to the external audio device 210 via a separate communication link (not shown). For example, the separate link (not shown) may be released when the transmission of the information related to the first communication link 231 is completed. In another example, the processor 410 may control the first communication circuit 420 (or the second communication circuit 430) to transmit the information related to the communication link (e.g., the first communication link 231 of FIG. 2) with the audio device 200 to the external server 240. When the external audio device 210 can communicate with the external server 240, the external audio device 210 may receive information related to the first communication link 231 from the external server 240.

According to certain embodiments, the processor 410 may control the first communication circuit 420 to perform communication based on a third wireless network with an external electronic device (e.g., the electronic device 102 or 104 or the server 108 of FIG. 1). For example, the third wireless network may include at least one of a 2G network, a 3G network, a 4G network (e.g., a long-term evolution (LTE) network), or a 5G network (e.g., a new radio (NR) network).

According to certain embodiments, the processor 410 may transmit and/or receive audio data, based on information related to the communication link (e.g., the first communication link 231 of FIG. 2) with the audio device 200. According to an embodiment, when the processor 410 provides a call function using the audio device 200, the processor 410 may transmit and/or receive audio data, based on information related to the communication link (e.g., the first communication link 231 of FIG. 2) with the audio device 200. For example, the processor 410 may control the second communication circuit 430 to transmit audio data received from the external electronic device via the first communication circuit 420 via the communication link (e.g., the first communication link 231 of FIG. 2) with the audio device 200, based on the information related to the communication link (e.g., the first communication link 231 of FIG. 2) with the audio device 200. According to an embodiment, the processor 410 may control the second communication circuit 430 to receive audio data via the communication link (e.g., the first communication link 231 of FIG. 2) with the audio device 200, based on the information related to the communication link (e.g., the first communication link 231 of FIG. 2) with the audio device 200. The processor 410 may control the first communication circuit 420 to transmit the audio data received from the audio device 200 to the external electronic device.

According to an embodiment, the processor 410 may transmit and/or receive audio data, based on information related to the communication link (e.g., the first communication link 231 of FIG. 2) with the audio device 200, regardless of role switching of the audio device 200 and the external audio device 210. For example, the processor 410 may transmit the audio data to the audio device 200 and/or the external audio device 210 via the first communication link 231, and may receive the audio data from the audio device 200 and/or the external audio device 210 via the first communication link 231.

According to certain embodiments, the first communication circuit 420 may support wireless communication with the external electronic device via the third wireless network. According to an embodiment, the first communication circuit 420 may include a first radio frequency integrated circuit (RFIC) and a first radio frequency front end (RFFE) for communication with the external electronic device via the third wireless network.

According to certain embodiments, the second communication circuit 430 may support wireless communication with the audio device 200 or the external audio device 210 via the second wireless network. According to an embodiment, the second communication circuit 430 may include a second RFIC and a second RFFE for wireless communication with the audio device 200 or the external audio device 210 via the second wireless network.

According to certain embodiments, the memory 440 may store various data used by at least one element (e.g., the processor 410, the first communication circuit 420, or the second communication circuit 430) included in the electronic device 220. For example, the data may include information related to at least one communication parameter related to the communication link with the audio device 200. According to an embodiment, the memory 440 may store various instructions which can be executed through the processor 410.

According to certain embodiments, the electronic device 220 may perform control to switch roles of the audio device 200 and the external audio device 210, based on noise detected from the audio device 200 and the external audio device 210. For example, the electronic device 220 may receive, from the audio device 200, information related to the external audio device 210 for monitoring the first communication link 231 established between the audio device 200 and the electronic device 220. In another example, the electronic device 220 may receive, from the audio device 200, information indicating that a device for transmitting audio data to the electronic device 220 for a retransmission interval of the first communication link 231 corresponds to the external audio device 210. According to an embodiment, when the electronic device 220 is linked with the audio device 200 and/or the external audio device 210 and provides a call function, the electronic device 220 may receive, at each designated period from the audio device 200 configured as a primary device, information related to noise detected from the audio device 200. When the electronic device 220 determines based on the noise detected from the audio device 200 that a role switching function of the audio devices 200 and 210 is activated, the electronic device 220 may transmit a noise level request signal related to the external audio device 210 configured as a secondary device to the audio device 200. For example, the electronic device 220 may receive information related to the noise from the audio device 200 via a separate communication link with the first communication link 231 for transmitting and/or receiving the audio data.

According to an embodiment, the electronic device 220 may receive, based on the noise level request signal related to the external audio device 210 at each designated period from the audio device 200 configured as a primary device, information related to noise detected from the external audio device 210 configured as a secondary device. The electronic device 220 determines to perform role switching of the audio devices 200 and 210, based on the noise detected from the external audio device 210, the electronic device may transmit a role switch request signal to the audio device 200. For example, when the electronic device 220 determines based on the noise detected from the audio device 200 and the external audio device 210 that noise is concentrated in the direction of the audio device 200, it may be determined that role switching of the audio devices 200 and 210 is performed.

According to certain embodiments, the electronic device 220 may receive audio data from the external audio device 210 or the audio device 200 configured as a primary device, based on the information related to the first communication link 231. According to an embodiment, the electronic device 220 may receive, from the audio device 200 configured as a primary device, information related to the external audio device 210 configured as a secondary device. According to an embodiment, the electronic device 220 may detect noise from audio data received from the audio device 200 configured as a primary device. When the intensity of noise detected from the audio data received from the audio device 200 satisfies a first reference level for a first time interval, the electronic device 220 may transmit a role switch request signal via the first communication link 231.

According to an embodiment, the electronic device 220 may detect, based on the role switching, noise from the audio data received from the external audio device 210 configured as a primary device (for example, configured as a device for transmitting audio data to the electronic device 220). When the intensity of the noise detected from the audio data received from the external audio device 210 satisfies a second reference level for a second time interval, the electronic device 220 may transmit a role switch request signal via the first communication link 231. For example, the electronic device 220 may receive role switch completion information from the audio device 200 or the external audio device 210 via the first communication link 231.

According to certain embodiments, an audio device (e.g., the electronic device 101 of FIG. 1 or the audio device 200 of FIG. 2 or FIG. 3) may include at least one microphone (e.g., the input module 150 of FIG. 1 or the microphone 322 of FIG. 3), a communication circuit (e.g., the wireless communication module 192 of FIG. 1 or the communication circuit 330 of FIG. 3), and at least one processor (e.g., the processor 120 of FIG. 1 or the processor 310 of FIG. 3) operatively connected to the at least one microphone and the communication circuit, in which the processor establishes a communication link (e.g., the first communication link 231 of FIG. 2) with an electronic device (e.g., the electronic device 220 of FIG. 2) via the communication link, transmits information related to the communication link to an external audio device (e.g., the external audio device 210 of FIG. 2) via the communication circuit, detects noise from an audio signal collected through the at least one microphone, identifies the noise of the external audio device when the noise detected through the at least one microphone satisfies a designated first condition, and controls the external audio device to transmit audio data to the electronic device when the noise for the external audio device satisfies a second condition that is different from the designated first condition.

According to certain embodiments, the audio device may further include at least one speaker (e.g., the sound output module 155 of FIG. 1 or the speaker 324 of FIG. 3), in which when the role for performing communication with the electronic device is configured as a primary device, the processor outputs audio data received from the electronic device via the communication link to the outside through the at least one speaker, and transmits audio data collected through the at least one microphone to the electronic device via the communication link.

According to certain embodiments, the processor may detect, based on a designated period, the noise through the at least one microphone, identify whether the noise detected through the microphone satisfies a first reference level for a designated first time interval when the noise detected through the at least one microphone satisfies the first reference level, and determine that the designated first condition is satisfied when noise satisfying the first reference level is continuously detected through the at least one microphone for the designated first time interval.

According to certain embodiments, the first time interval may be configured based on a battery state of the audio device and the noise detected through the at least one microphone.

According to certain embodiments, the processor may determine that the first reference level is satisfied when the noise detected through the at least one microphone exceeds the first reference level.

According to certain embodiments, the processor may periodically transmit a noise level request signal to the external audio device, based on a noise detection period of the external audio device when the noise detected through the at least one microphone satisfies the designated first condition, and receive information related to the noise from the external audio device in response to the noise level request signal.

According to certain embodiments, the processor may detect, based on the noise detection period of the external audio device, noise through the at least one microphone, and transmit the noise level request signal to the external audio device when the noise detected through the microphone satisfies a first reference level.

According to certain embodiments, the processor may transmit a noise level request signal to the external audio device when the noise detected through the microphone satisfies the designated first condition, and periodically receive information related to noise of the external audio device from the external audio device.

According to certain embodiments, the processor may identify whether the noise of the external audio device satisfies a second reference level for a designated second time interval when the noise of the external audio device satisfies the second reference level, and determine that the designated second condition is satisfied when the noise of the external audio device continuously satisfies the second reference level for the designated second time interval.

According to certain embodiments, the second time interval corresponds to a time interval which is different from or at least partially overlaps a first time interval included in the first designated condition, and may be configured based on a battery state of the external audio device and the noise of the external audio device.

According to certain embodiments, when the noise of the external audio device is equal to or lower than the second reference level that is relatively lower than a first reference level included in the first designated condition, the processor may determine that the second reference level is satisfied.

Figure 5:
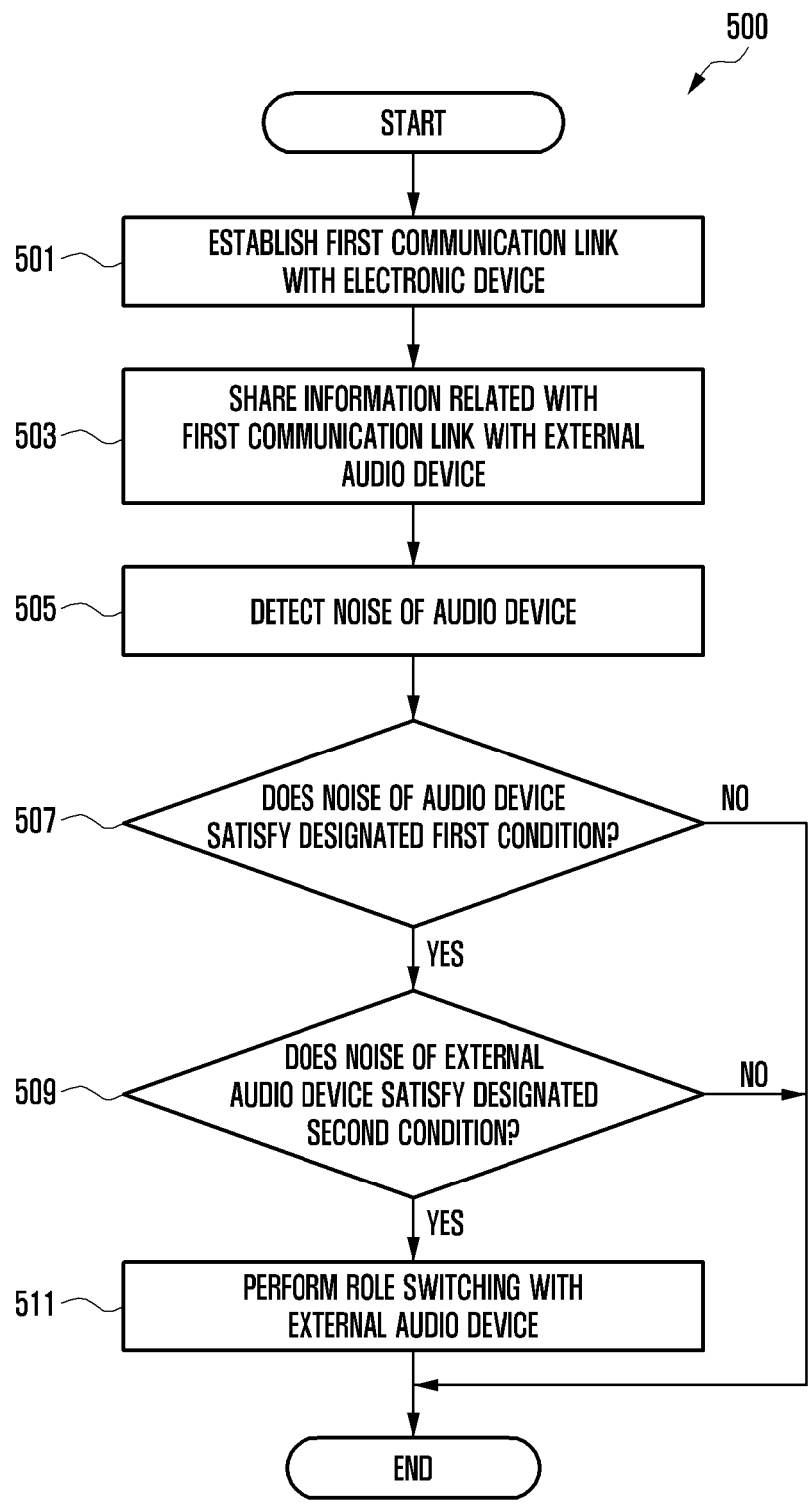
FIG. 5 is a flow chart illustrating switching of a role of an audio device in an audio device according to certain embodiments.

FIG. 5 is a flow chart 500 illustrating switching of a role of an audio device in an audio device according to certain embodiments. Operations in the following embodiment may be sequentially performed, but sequential execution is not mandatory and other variations are contemplated. For example, the sequences of the operations may be changed, and two or more operations may be performed in parallel. For example, the audio device of FIG. 5 may be the electronic device 101 of FIG. 1 or the audio device 200 of FIG. 2 or FIG. 3.

According to certain embodiments referring to FIG. 5, in operation 501, an audio device (e.g., the processor 120 or the wireless communication module 192 of FIG. 1 or the processor 310 or the communication circuit 330 of FIG. 3) may establish a first communication link (e.g., the first communication link 231 of FIG. 2) with the electronic device 220. According to an embodiment, the processor 310 may control the communication circuit 330 to establish the first communication link 231 with the electronic device 220 via a first wireless network. According to an embodiment, when the processor 310 establishes the first communication link 231 with the electronic device 220, the processor 310 may configure information related to the communication link with the electronic device 220 through negotiation with the electronic device 220. For example, the information related to the communication link with the electronic device 220 may include at least one communication parameter for transmitting and/or receiving audio data (or voice data) by the audio device 200 and the electronic device 220. For example, the information related to the communication link with the electronic device 220 may include at least one of a channel resource for transmission and/or reception of audio data, a codec, an LT address, a packet type, a packet length, a transmission period (or a transmission interval) (e.g., $T_{eSCO}$) of audio data, a retransmission interval (e.g., $W_{eSCO}$), or information (e.g., $D_{eSCO}$) related to a synchronous configuration.

According to certain embodiments, in operation 503, an audio device 200 (e.g., the processor 120 or 310, the wireless communication module 192, or the communication circuit 330) may share the information related to the first communication link with the external audio device 210. According to an embodiment, the processor 310 may control the communication circuit 330 to transmit, to the external audio device 210, the information related to the communication link (e.g., the first communication link 231 of FIG. 2) with the electronic device 220 via the communication link (e.g., the second communication link 233 of FIG. 2) with the external audio device 210. For example, the communication link (e.g., the second communication link 233 of FIG. 2) with the external audio device 210 may be established before or after the audio device 200 establishes the first communication link 231 with the electronic device 220. According to an embodiment, the processor 310 may transmit, to the external server 240, the information related to the communication link (e.g., the first communication link 231 of FIG. 2) with the electronic device 220. The external audio device 210 may acquire the information related to the communication link (e.g., the first communication link 231 of FIG. 2) with the electronic device 220 from the external server 240.

According to certain embodiments, in operation 505, the audio device 200 (e.g., the processor 120 or 310) may detect noise (e.g., a noise level) present in an audio signal. According to an embodiment, the processor 310 may collect an audio signal through a microphone 322 at a designated period. The processor 310 may detect a level of noise present in the audio signal collected through the microphone 322.

According to certain embodiments, in operation 507, the audio device (e.g., the processor 120 or 310) may determine whether the noise of the audio device 200 detected through the microphone satisfies a designated first condition. According to an embodiment, the processor 310 may identify whether the intensity (e.g., a noise level) of the noise detected through the microphone 322 satisfies a first reference level for a first time interval. For example, satisfying the first reference level may include a state in which the intensity of the noise detected through the microphone 322 exceeds the first reference level. For example, satisfying the first reference level for the first time interval may include a state in which the intensity of the noise detected through the microphone 322 consecutively reaches the first reference level a designated number of times within the first time interval. According to an embodiment, when the intensity of the noise detected through the microphone 322 satisfies a first reference level for the first time interval, the processor 310 may determine that a designated first condition is satisfied. According to an embodiment, when the intensity of the noise detected through the microphone 322 fails to satisfy the first reference level within the first time interval or before the first time interval is configured, the processor 310 may determine that the designated first condition fails to be satisfied. For example, the state not satisfying the first reference level may include a state in which the intensity of the noise detected through the microphone 322 is equal to or lower than the first reference level.

According to certain embodiments, when it is determined that the noise detected from the audio device 200 through the microphone fails to satisfy the designated first condition (e.g., "No" in operation 507), the audio device (e.g., the processor 120 or 310) may terminate the process of role switching for the audio device 200. According to an embodiment, when it is determined that the noise detected from the audio device 200 through the microphone fails to satisfy the designated first condition, the processor 310 may determine that a call function can be provided (or maintained) through the microphone 322 of the audio device 200. When it is determined that the call function can be provided through the microphone 322 of the audio device 200, the processor 310 may determine that the role switching of the audio device 200 and the external audio device 210 is unnecessary. According to an embodiment, when it is determined that the role switching of the audio device 200 and the external audio device 210 is unnecessary, the audio device 200 may perform an operation (e.g., operation 505) of determining whether the noise of the audio device 200 satisfies the designated first condition for a designated period or in a case where a designated event (e.g., occurrence of big noise) occurs.

According to certain embodiments, when it is determined that the noise detected from the audio device 200 through the microphone satisfies the designated first condition (e.g., if "Yes" in operation 507), the audio device (e.g., the processor 120 or 310) may identify in operation 509 whether the noise of a second audio signal generated via the external audio device 210 satisfies a designated second condition. According to an embodiment, when it is determined that the noise detected through the microphone 322 satisfies the designated first condition, the processor 310 may control the communication circuit 330 to transmit a noise level request signal to the external audio device 210. The processor 310 may receive the information related to the noise of the second audio signal from the external audio device 210 through the communication circuit 330 in response to the noise level request signal. For example, the processor 310 may transmit the noise level request signal to the external audio device 210, based on the designated period, and identify the noise of the external audio device 210. In another example, the processor 310 may periodically receive the information related to the noise from the external audio device 210, based on the noise level request signal. For example, the information related to the noise may include at least one of the intensity (e.g., a noise level) of the noise detected from the external audio device 210 or information related to a result of comparison between the intensity of the noise detected from the external audio device 210 and a second reference level.

According to an embodiment, the processor 310 may identify whether the intensity of the noise detected from the external audio device 210 satisfies the second reference level for a second time interval. For example, satisfying the second reference level may include a state in which the intensity of the noise detected from the external audio device 210 is equal to or lower than the second reference level. For example, satisfying the second reference level for the second time interval may include a state in which the intensity of the noise detected from the external audio device 210 consecutively meets the second reference level a designated number of times within the second time interval. According to an embodiment, when the intensity of the noise detected from the external audio device 210 satisfies the second reference level for the second time interval, the processor 310 may determine that a designated second condition is satisfied. According to an embodiment, when the intensity of the noise detected from the external audio device 210 fails to satisfy the second reference level for the second time interval or before the second time interval is configured, the processor 310 may determine that the designated second condition fails to be satisfied. For example, failing to meet the second reference level may include a state in which the intensity of the noise detected from the external audio device 210 exceeds the second reference level. According to an embodiment, the second reference level may be identical or lower than the first reference level.

According to certain embodiments, when it is determined that the noise of the external audio device 210 fails to satisfy the designated second condition (e.g., if "No" in operation 509), the audio device (e.g., the processor 120 or 310) may terminate the process for role switching of the audio device 200. According to an embodiment, when it determined that the designated second condition of the external audio device 210 fails to be satisfied, the processor 310 may determine that the role switching of the audio device 200 and the external audio device 210 is unnecessary. For example, when it is determined that the designated second condition of the external audio device 210 fails to be satisfied, the processor 310 may determine that that the noise is not concentrated in the audio device 200, and thus the role switching of the external audio device 210 is unnecessary.

According to certain embodiments, when it is determined that the noise of the external audio device 210 meets the designated second condition (e.g., if "Yes" in operation 509), the audio device (e.g., the processor 120 or 310) may perform, in operation 511, role switching with the external audio device 210. According to an embodiment, when it is determined that the designated second condition of the external audio device 210 is satisfied, the processor 310 may determine that the role switching with the external audio device 210 is to be performed. For example, when it is determined that the designated second condition of the external audio device 210 is satisfied, the processor 310 may determine that the noise is concentrated in the audio device 200, and thus audio data received using the microphone of the external audio device 210 (rather than the audio device 200) should be transmitted to the electronic device 220. When it is determined that the audio data received using the microphone of the external audio device 210 is to be transmitted to the electronic device 220, the processor 310 may perform role switching with the external audio device 210. According to an embodiment, when it is determined the role switching with the external audio device 210 is to be performed, the processor 310 may configure a role switching time point. The processor 310 may control the communication circuit 330 to transmit a role switching request signal including the role switching time point to the external audio device 210. When the role switching time point arrives, the processor 310 may switch the role of the audio device 200 from the primary device to a secondary device driven, based on a control of the external audio device 210 which is now configured as the primary device. According to an embodiment, when the role of the audio device 200 is switched to the secondary device, transmission of audio data to the electronic device 220 by the audio device 200 via the first communication link 231 may be restricted, with this operation being performed instead by the new primary device, the external audio device 210.

According to certain embodiments, when the audio device 200 is configured as a primary device, the audio device 200 may transmit and/or receive audio data to or from the electronic device 220. According to an embodiment, the processor 310 may control the audio module 320 to output the audio data received from the electronic device 220 to the outside through the speaker 324, based on the information related to the first communication link 231 with the electronic device 220. According to an embodiment, the processor 310 may control the communication circuit 330 to transmit audio data collected through the microphone 322 to the electronic device 220, based on the information related to the first communication link 231 with the electronic device 220.

According certain embodiments, when the audio device 200 is configured as a secondary device, based on the role switching with the external audio device 210, the audio device 200 may monitor the first communication link 231, based on the information related to the first communication link 231. According to an embodiment, the processor 310 may acquire audio data transmitted via the first communication link 231 by the electronic device 220 through monitoring based on information related to the first communication link 231. The processor 310 may control the audio module 320 to output the audio data acquired through the monitoring to the outside through the speaker 324. According to an embodiment, when the audio device 200 is configured as a secondary device, based on the role switching with the external audio device 210, the audio device 200 may control the communication circuit 330 not to collect the audio data through the microphone 322, or not to transmit the audio data collected through the microphone 322 to the electronic device 220.

According to certain embodiments, when it is determined that the noise detected from the audio device 200 through the microphone satisfies the designated first condition, the audio device 200 may determine, based on the noise of the audio device 200, whether to transmit a noise level request signal. According to an embodiment, when a period for identification of the noise by the external audio device 210 arrives, the processor 310 may detect the intensity of the noise through the microphone 322. For example, when the intensity (e.g., a noise level) of the noise detected through the microphone 322 satisfies the first reference level, the processor 310 may control the communication circuit 330 to transmit a noise level request signal to the external audio device 210. In another example, when the intensity (e.g., a noise level) of the noise detected through the microphone 322 fails to satisfy the first reference level, the processor 310 may restrict transmission of the noise level request signal.

Figure 6:
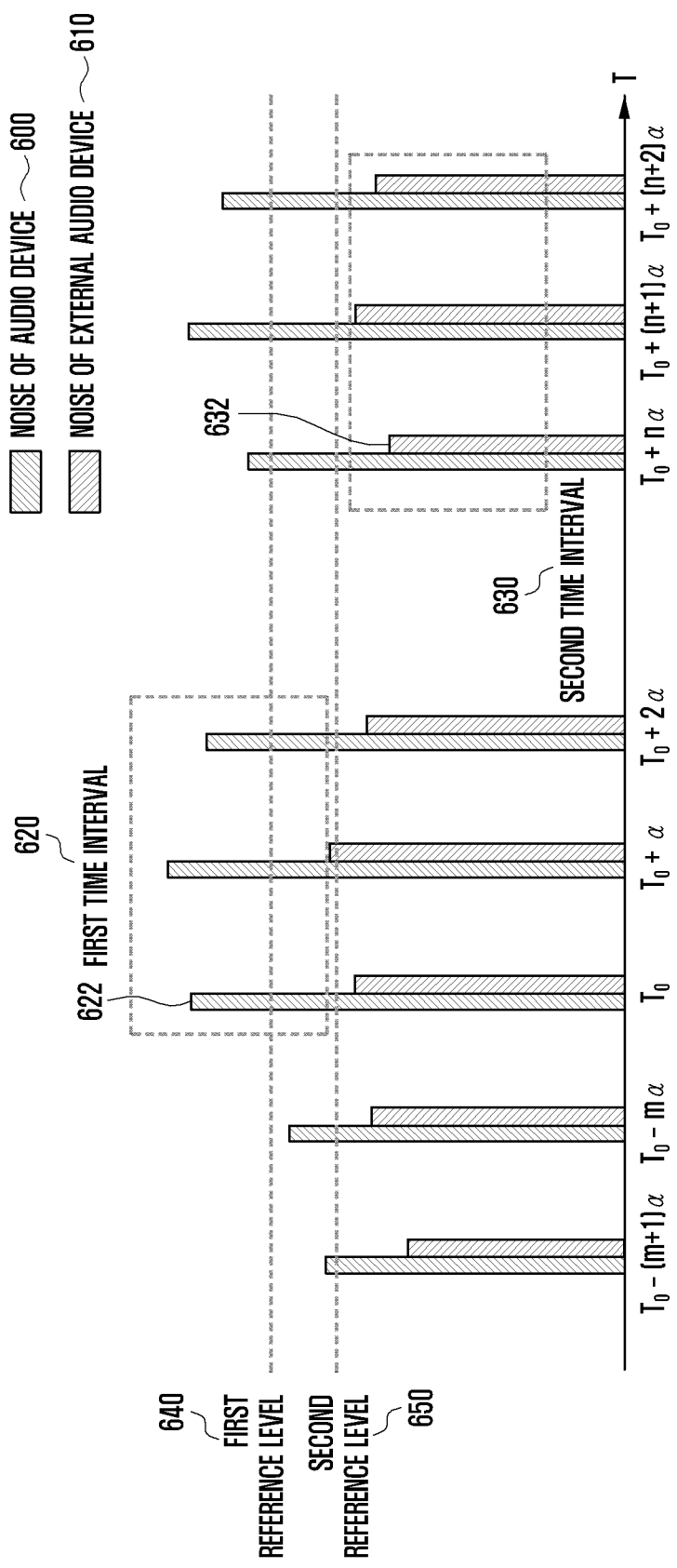
FIG. 6 illustrates an example of the intensity of noise measured in audio devices according to certain embodiments.

FIG. 6 illustrates an example of the intensity of noise measured in audio devices according to certain embodiments.

According to certain embodiments referring to FIG. 6, the audio device 200 and the external audio device 210 may be communicatively paired with the electronic device 220 while a call function is executed. According to an embodiment, when the audio device 200 is configured as a primary device, the audio device 200 may output audio data received based on information related to the first communication link 231 with the electronic device 220 from the electronic device 220 through the speaker 324. The audio device 200 may transmit audio data collected through the microphone 322 to the electronic device 220, based on the information related to the first communication link 231 with the electronic device 220. According to an embodiment, when the external audio device 210 is configured as a secondary device, the external audio device 210 may detect audio data transmitted to the audio device 200 by the electronic device 220, through monitoring of the first communication link 231, based on the information related to the first communication link 231 with the electronic device 220. The external audio device 210 may output the audio data detected through the monitoring, through a speaker. According to an embodiment, when the external audio device 210 is configured as a secondary device, the external audio device 210 may not collect the audio data through a microphone (e.g., the microphone 322), or may not transmit the audio data collected through the microphone to the electronic device 220.

According to certain embodiments, the audio device 200 and the external audio device 210 may detect noise 600 and 610 at each designated period (e.g., a). According to an embodiment, the audio device 200 may detect noise 600 from audio data collected through the microphone 322, at each designated period. According to an embodiment, the external audio device 210 may detect noise 610 from audio data collected through the microphone of the external audio device 210, at each designated period.

According to certain embodiments, the audio device 200 may identify whether the intensity (e.g., a noise level) of the noise 600 detected through the microphone 322 continuously exceeds a first reference level 640 for a first time interval 620, starting from a time point at which the intensity (e.g., a noise level) of the noise 600 detected through the microphone 322 first exceeds the first reference level 640. For example, the first time interval 620 may include a designated time or a designated number of times. According to an embodiment, the first time interval 620 may change according to the intensity (e.g., a noise level) of the noise 600 detected through the microphone 322 or the state (e.g., a residual amount of a battery) of the audio device 200. According to an embodiment, when the intensity of the noise 600 detected through the microphone 322 exceeds the first reference level 640 for the first time interval 620 periodically (for example, at a designated period (e.g., a)), the audio device 200 may transmit a noise level request signal to the external audio device 210. According to certain embodiments, the audio device 200 may identify the noise 610 of the external audio device 210, based on the noise level request signal. According to an embodiment, when the intensity (e.g., a noise level) of the noise 610 of the external audio device 210 is equal to or lower than a second reference level 650 (632), the audio device 200 may identify whether the intensity (e.g., a noise level) of the noise 610 of the external audio device 210 is continuously equal to or lower than the second reference level 650 for a second time interval 630. For example, the second time interval 630 may include a designated time or a designated number of times. According to an embodiment, the second time interval 630 may be configured in the same manner as or a different manner from the first time interval 620. For example, the second time interval 630 may change according to the intensity (e.g., a noise level) of the noise 610 detected through the microphone of the external audio device 210 or the state (e.g., a residual amount of a battery) of the external audio device 210. According to an embodiment, when the intensity of the noise 610 detected from the external audio device 210 is equal to or lower than a second reference level 650 for the second time interval 630 periodically (for example, at a designated period (e.g., a)), the audio device 200 may determine to perform role switching with the external audio device 210.

According to certain embodiments, when the noise 600 of the audio device 200 continuously exceeds the first reference level 640 for the first time interval 620 and the noise of the external audio device 210 is continuously equal to or lower than the second reference level 650 for the second time interval 630, the audio device 200 may determine that the noise is concentrated in the direction of the audio device 200. The audio device 200 may perform, based on the noise concentrated in the direction of the audio device 200, role switching with the external audio device 210 so as to perform a call function by using the microphone of the external audio device 210.

According to certain embodiments, when the noise of the external audio device 210 continuously exceeds the second reference level 650 for the second time interval 630, the audio device 200 may determine not to perform role switching with the external audio device 210.

According to certain embodiments, when the noise of the external audio device 210 exceeds the second reference level 650 at a specific time point within the second time interval 630, the audio device 200 may determine not to perform role switching with the external audio device 210.

According to certain embodiments, the external audio device 210 may detect the noise, based on a designated period from a time point of receiving a noise level request signal from the audio device 200. According to certain embodiments, when the external audio device 210 is linked with the electronic device 220 and provides a call function, the external audio device 210 may detect the noise, based on a designated period.

According to certain embodiments, when the noise detected through the microphone 322 satisfies a first reference level for a first time interval, the audio device 200 may identify the intensity of the noise of the external audio device 210 to determine whether to perform role switching with the external audio device 210. The audio device 200 may determine not to perform role switching, based on the noise detected through the microphone 322 in a state of identifying the intensity of the noise of the external audio device 210. According to an embodiment, the audio device 200 may detect, while identifying the noise of the external audio device 210, the noise through the microphone 322, based on a designated period. For example, when the intensity of the noise detected through the microphone 322 satisfies a first reference level, the audio device 200 may determine whether to perform role switching with the external audio device 210, based on the intensity of the noise of the external audio device 210. In another example, when the intensity of the noise detected through the microphone 322 satisfies a third reference level, which is relatively lower than the first reference level, for a third time interval, the audio device 200 may determine not to perform role switching. For example, a state of satisfying the third reference level may include a state in which the intensity of the noise detected through the microphone 322 is equal to or lower than the third reference level. For example, a state satisfying the third reference level for the third time interval may include a state in which the intensity of the noise detected through the microphone 322 consecutively satisfies the third reference level by a designated number of times included in the third time interval. For example, the third time interval may be configured in the same manner as or a different manner from the second time interval, and may be configured based on the intensity of the noise acquired through the microphone 322 or the state (e.g., a residual amount of a battery) of the audio device 200. For example, the third reference level corresponds to a reference level for determining, based on the intensity of the noise introduced through the microphone 322, whether the microphone 322 can be used for a call function, and may be configured in the same manner as or a different manner from the second reference level.

According to certain embodiments, when the noise detected through the microphone 322 satisfies the first reference level 640 for the first time interval 620, the audio device 200 may identify the intensity of the noise of the external audio device 210, based on the information related to the noise received based on a designated period from the external audio device 210. According to an embodiment, when the intensity of the noise of the external audio device 210 is lower than or equal to the intensity of the noise detected through the microphone 322, the audio device 200 may identify whether the intensity of the noise of the external audio device 210 satisfies a second reference level. For example, when the intensity of the noise of the external audio device 210 satisfies the second reference level for a designated second time interval, the audio device 200 may determine to perform role switching with the external audio device 210. In another example, when the intensity of the noise detected from the external audio device 210 fails to satisfy the second reference level before the designated second time interval expires, the audio device 200 may determine not perform role switching with the external audio device 210. According to an embodiment, when the intensity of the noise of the external audio device 210 is higher than the intensity of the noise detected through the microphone 322, the audio device 200 may determine not to perform role switching with the external audio device 210. For example, the intensity of the noise detected through the microphone 322 may include at least one of the intensity of noise detected through the microphone at a time point (e.g., a designated period) that is identical or similar to a time point at which noise is detected from the external audio device 210, an average of intensities of noise detected through the microphone 322 for a first time interval, or an average of intensities of noise detected through the microphone 322 for the first time interval and a second time interval.

Figure 7:
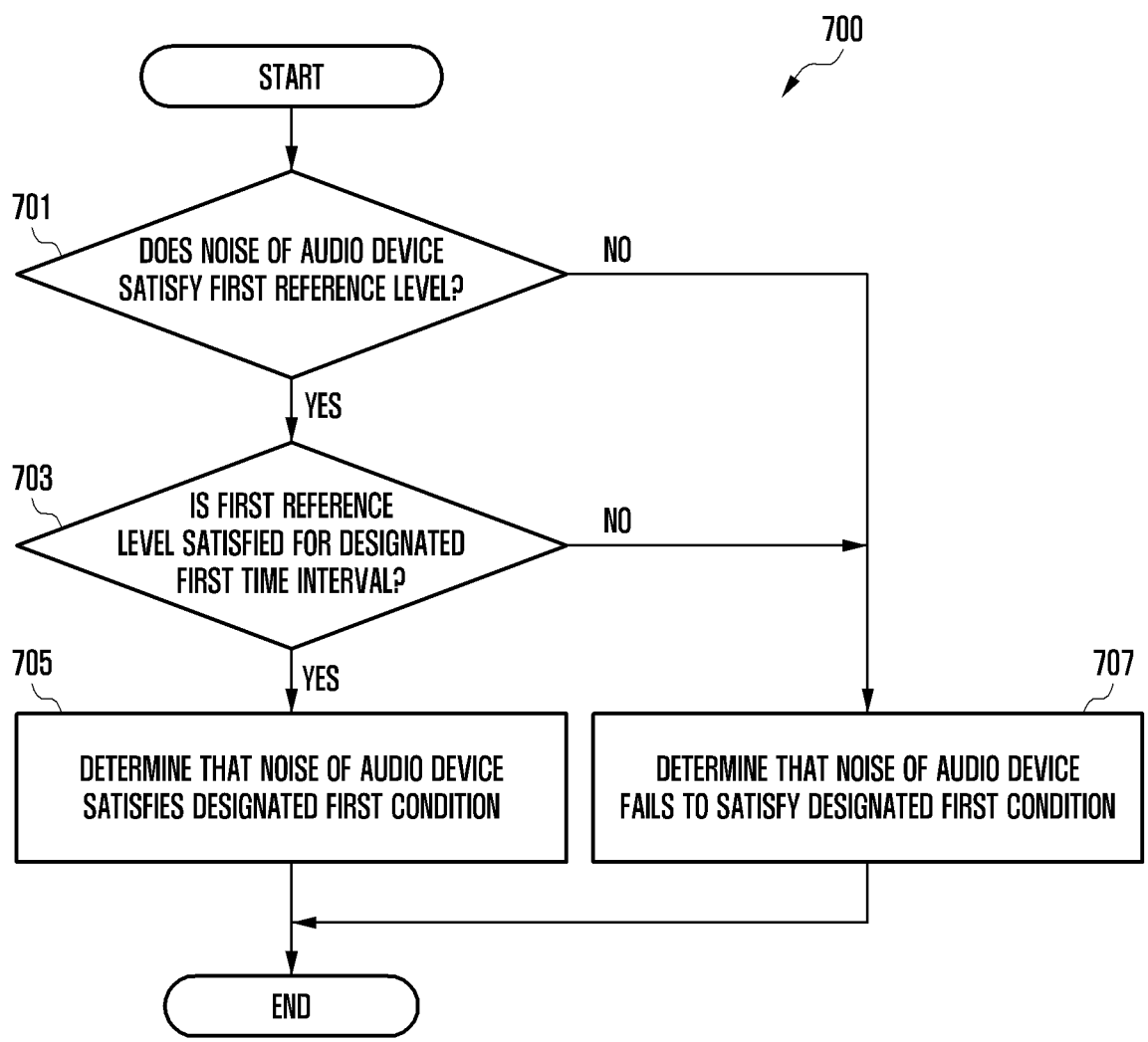
FIG. 7 is a flow chart illustrating determining, by an audio device, of whether to perform role switching, based on noise introduced into the audio device according to certain embodiments.

FIG. 7 is a flow chart 700 illustrating determining, by an audio device, of whether to perform role switching, based on noise introduced into the audio device according to certain embodiments. According to an embodiment, operations of FIG. 7 may be detailed operations of operation 507 of FIG. 5. Operations in the following embodiment may be sequentially performed, but are not mandatorily sequentially performed. For example, the sequences of the operations may be changed, and two or more operations may be performed in parallel. For example, the audio device of FIG. 7 may be the electronic device 101 of FIG. 1 or the audio device 200 of FIG. 2 or FIG. 3.

According to certain embodiments referring to FIG. 7, in operation 701, an audio device (e.g., the processor 120 of FIG. 1 or the processor 310 of FIG. 3) may identify whether noise of the audio device 200 satisfies a first reference level. According to an embodiment, the processor 310 may compare the intensity (e.g., a noise level) of noise detected based on a designated period through a microphone 322 with a first reference level. For example, when the intensity of the noise detected through the microphone 322 exceeds the first reference level, the processor 310 may determine that the noise of the audio device 200 satisfies the first reference level. In another example, when the intensity of the noise detected through the microphone 322 is equal to or lower than the first reference level, the processor 310 may determine that the noise of the audio device 200 fails to satisfy the first reference level.

According to certain embodiments, when the noise of the audio device 200 satisfies the first reference level (e.g., if "Yes" in operation 701), an audio device (e.g., the processor 120 or 310) may identify, in operation 703, whether the noise of the audio device 200 satisfies the first reference level for a designated first time interval from a time point at which the noise first satisfies the first reference level. That is, the noise must meet or exceed the first reference level for a designated period of time. According to an embodiment, the processor 310 may identify whether the noise periodically detected from the audio device 200 consecutively satisfies the first reference level for a designated time or a first designated number of times. According to an embodiment, the first time interval may change according to the intensity (e.g., a noise level) of the noise detected through the microphone 322 or the state (e.g., a residual amount of a battery) of the audio device 200.

According to certain embodiments, when the noise of the audio device 200 satisfies the designated first time interval (e.g., if "Yes" in operation 703), the audio device (e.g., the processor 120 or 310) may determine, in operation 705, that the noise of the audio device 200 satisfies a first condition. According to an embodiment, when the intensity of the noise periodically detected through the microphone 322 satisfies the first reference level for the first time interval, the processor 310 may determine that a designated first condition is satisfied. According to an embodiment, when the noise periodically detected from the audio device 200 consecutively satisfies the first reference level for a designated first number of times, the processor 310 may determine that the designated first condition is satisfied.

According to certain embodiments, when the noise of the audio device 200 fails to satisfy the first reference level (e.g., if "No" in operation 701) or fails to satisfy the first reference level (e.g., if "No" in operation 703) within a designated time interval, the audio device (e.g., the processor 120 or 310) may determine in operation 707 that the noise of the audio device 200 fails to satisfy the designated first condition. According to an embodiment, when the intensity of the noise detected through the microphone 322 within the first time interval or before the first time interval is configured fails to satisfy the first reference level, the processor 310 may determine that the designated first condition fails to be satisfied.

According to certain embodiments, when the noise of the audio device 200 satisfies the designated first condition, the audio device 200 may transmit a noise level request signal to the external audio device 210 to determine whether the noise is concentrated in the direction in which the audio device 200 is worn.

According to certain embodiments, when the noise of the audio device 200 fails to satisfy the designated first condition, the audio device 200 may determine that a call function can be provided by using the microphone 322 of the audio device 200.

Figure 8:
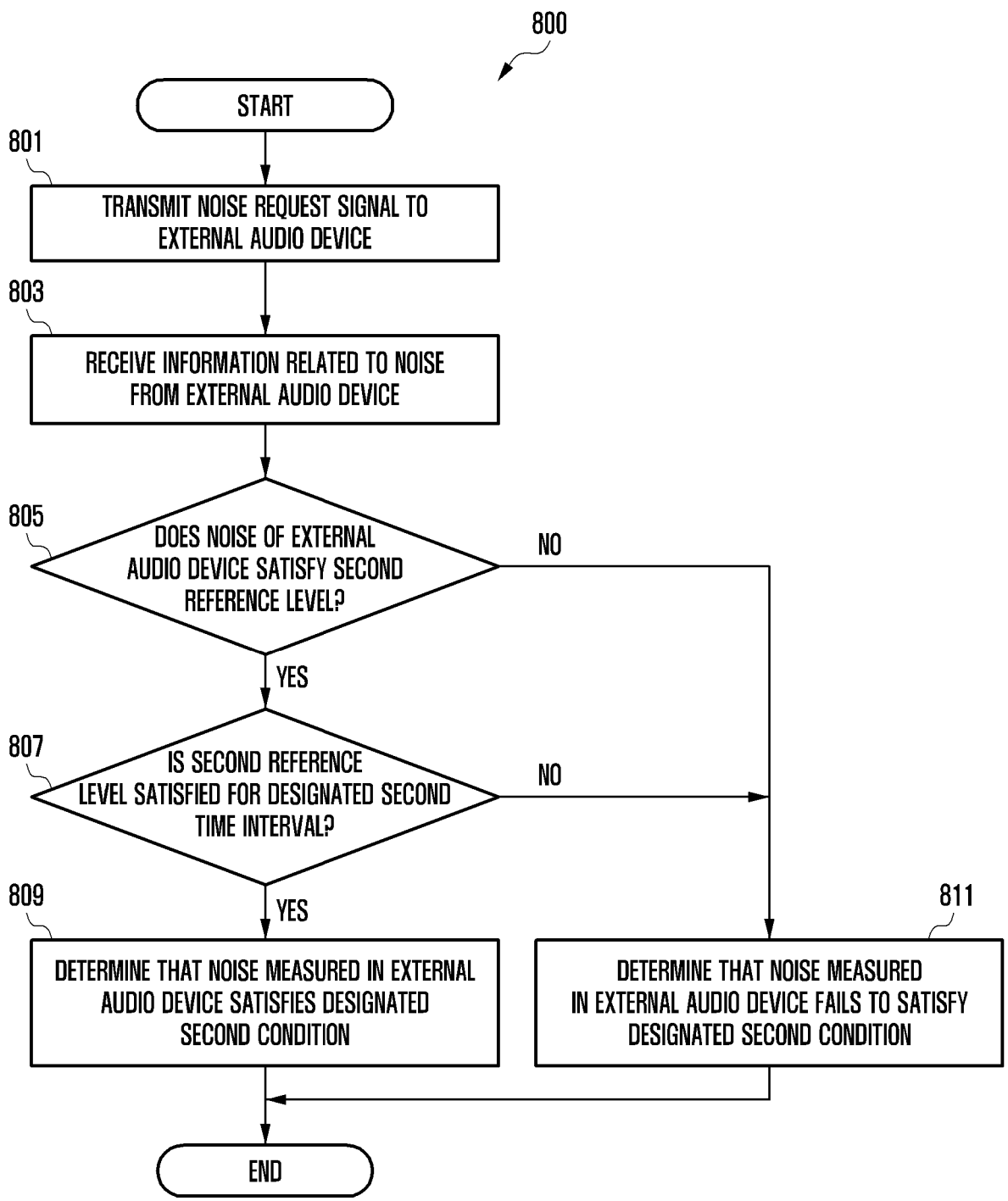
FIG. 8 is a flow chart illustrating determining, by an audio device, of whether to perform role switching, based on noise of another audio device according to certain embodiments.

FIG. 8 is a flow chart 800 illustrating determining, by an audio device, of whether to perform role switching, based on noise of another audio device according to certain embodiments. According to an embodiment, operations of FIG. 8 may be detailed operations of operation 509 of FIG. 5. Operations in the following embodiment may be sequentially performed, but are not mandatorily sequentially performed. For example, the sequences of the operations may be changed, and two or more operations may be performed in parallel. For example, the audio device of FIG. 8 may be the electronic device 101 of FIG. 1 or the audio device 200 of FIG. 2 or FIG. 3.

According to certain embodiments referring to FIG. 8, in operation 801, an audio device (e.g., the processor 120 of FIG. 1 or the processor 310 of FIG. 3) may transmit a noise level request signal to an external audio device 210, i.e., when noise of the audio device 200 satisfies a designated first condition (e.g., "Yes" in operation 507 of FIG. 5; and "Yes" in operations 701-703 of FIG. 7).

According to certain embodiments, in operation 803, the audio device (e.g., the processor 120 or 310) may receive information related to noise of the external audio device 210 from the external audio device 210 in response to the noise level request signal. According to an embodiment, when noise detected through the microphone 322 satisfies the designated first condition, the processor 310 may control the communication circuit 330 to transmit the noise level request signal to the external audio device 210, based on a period for identification of the noise by the external audio device 210. The processor 310 may receive the information related to the noise from the external audio device 210 in response to the noise level request signal. According to an embodiment, when the noise detected through the microphone 322 satisfies the designated first condition, the processor 310 may control the communication circuit 330 to transmit the noise level request signal to the external audio device 210. The processor 310 may periodically receive the information related to the noise, from the external audio device 210 through the communication circuit 330 in response to the noise level request signal. For example, the information related to the noise may include at least one of the intensity (e.g., a noise level) of the noise detected from the external audio device 210 or information related to a result of comparison between a second reference level and the intensity of the noise detected from the external audio device 210.

According to certain embodiments, in operation 805, the audio device (e.g., the processor 120 or 310) may identify whether the noise of the external audio device 210 meets the second reference level. According to an embodiment, the processor 310 may compare the intensity (e.g., a noise level) of the noise detected the external audio device 210 with the second reference level. For example, when the intensity of the noise detected from the external audio device 210 is equal to or lower than the second reference level, the processor 310 may determine that the noise of the external audio device 210 satisfies the second reference level. In another example, when the intensity of the noise detected from the external audio device 210 exceeds the second reference level, the processor 310 may determine that the noise of the external audio device 210 fails to satisfy the second reference level.

According to certain embodiments, when the noise of the external audio device 210 satisfies the second reference level (e.g., if "Yes" in operation 805), the audio device (e.g., the processor 120 or 310) may identify, in operation 807, whether the noise of the external audio device 210 satisfies the second reference level for a designated second time interval from a time point at which the noise of the external audio device 210 first satisfies the second reference level. According to an embodiment, the processor 310 may identify whether the noise periodically detected from the external audio device 210 consecutively satisfies the second reference level for a designated time interval or by a designated second number of times. For example, the second time interval 630 may change according to the intensity (e.g., a noise level) of the noise 610 detected through the microphone of the external audio device 210 or the state (e.g., a residual amount of a battery) of the external audio device 210.

According to certain embodiments, when the noise of the external audio device 210 satisfies the second reference level for a designated second time interval (e.g., if "Yes" in operation 807), the audio device (e.g., the processor 120 or 310) may determine, in operation 809, that the noise of the external audio device 210 satisfies the designated second condition. According to an embodiment, when the intensity of the noise detected through the microphone of the external audio device 210 continuously satisfies the second reference level for the second time interval, the processor 310 may determine that the designated second condition is satisfied. According to an embodiment, when the noise periodically detected from the external audio device 210 consecutively satisfies the second reference level for a designated time interval or by a designated second number of times, the processor 310 may determine that the designated second condition is satisfied.

According to certain embodiments, when the noise of the external audio device 210 fails to satisfy the second reference level (e.g., if "No" in operation 805) or the noise of the external audio device 210 fails to satisfy the second reference level within the designated second time interval (e.g., if "No" in operation 807), the audio device (e.g., the processor 120 or 310) may determine, in operation 811, that the noise of the external audio device 210 fails to satisfy the designated second condition. According to an embodiment, when the intensity of the noise detected through the microphone of the external audio device 210 fails to satisfy the second reference level within the second time interval or before the second time interval is configured, the processor 310 may determine that the designated second condition fails to be satisfied.

According to certain embodiments, when the noise of the external audio device 210 satisfies the designated second condition, the audio device 200 may determine that the noise is concentrated in the direction in which the audio device 200 is worn. The audio device 200 may perform role switching with the external audio device 210 in order to use the microphone of the external audio device 210 for a call function.

According to certain embodiments, when the noise of the external audio device 210 fails to satisfy the designated second condition, the audio device 200 may determine that the noise is not concentrated in the direction in which the audio device 200 is worn. For example, when the noise of the external audio device 210 fails to satisfy the designated second condition, the audio device 200 may determine that the role switching with the external audio device 210 is unnecessary.

Figure 9A:
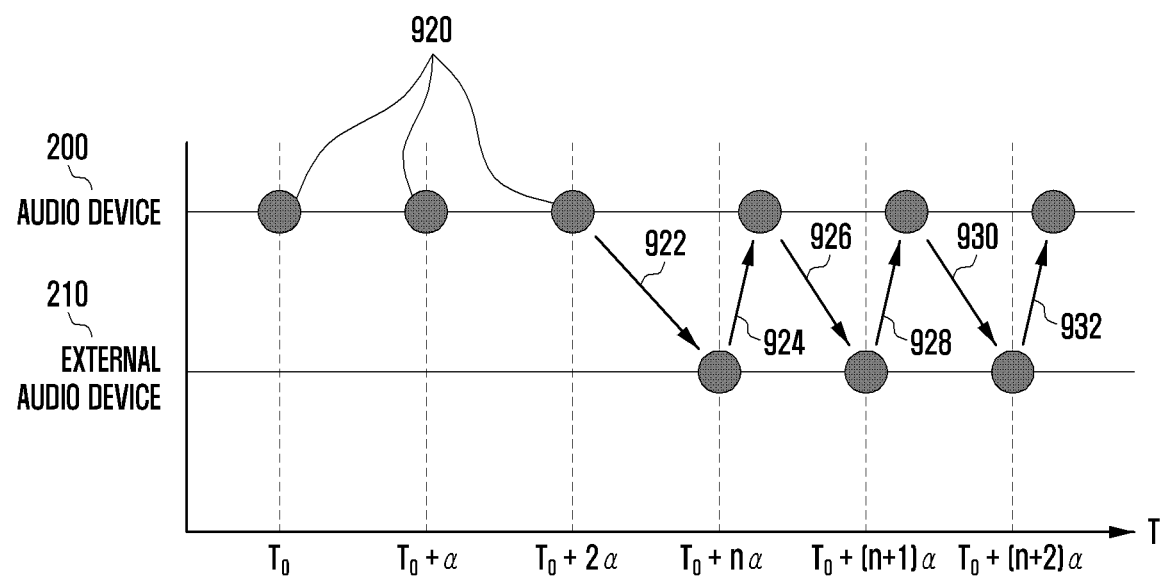
FIG. 9A illustrates an example of identifying noise of another audio device by an audio device according to certain embodiments.

FIG. 9A illustrates an example of identifying noise of another audio device by an audio device according to certain embodiments.

According to certain embodiments referring to FIG. 9A, when noise satisfying a first reference level for a first time interval is detected from the audio device 200 (920), the audio device 200 may periodically identify information related to the noise of the external audio device 210. According to an embodiment, when it is determined based on the noise of the audio device 200 that a designated first condition is satisfied, the audio device 200 may transmit a noise level request signal to the external audio device 210 (922). When a period (e.g., $T_0+n\alpha$) for identification of noise by the external audio device 210 arrives, the external audio device 210 may transmit information related to the noise detected through the microphone of the external audio device 210 to the audio device 200 in response to the noise level request signal (924). For example, the audio device 200 may periodically transmit the noise level request signal to the external audio device 210 (922, 926, and 930). The external audio device 210 may periodically transmit the information related to the noise of the external audio device 210 to the audio device 200 in response to the noise level request signal (924, 928, and 932).

Figure 9B:
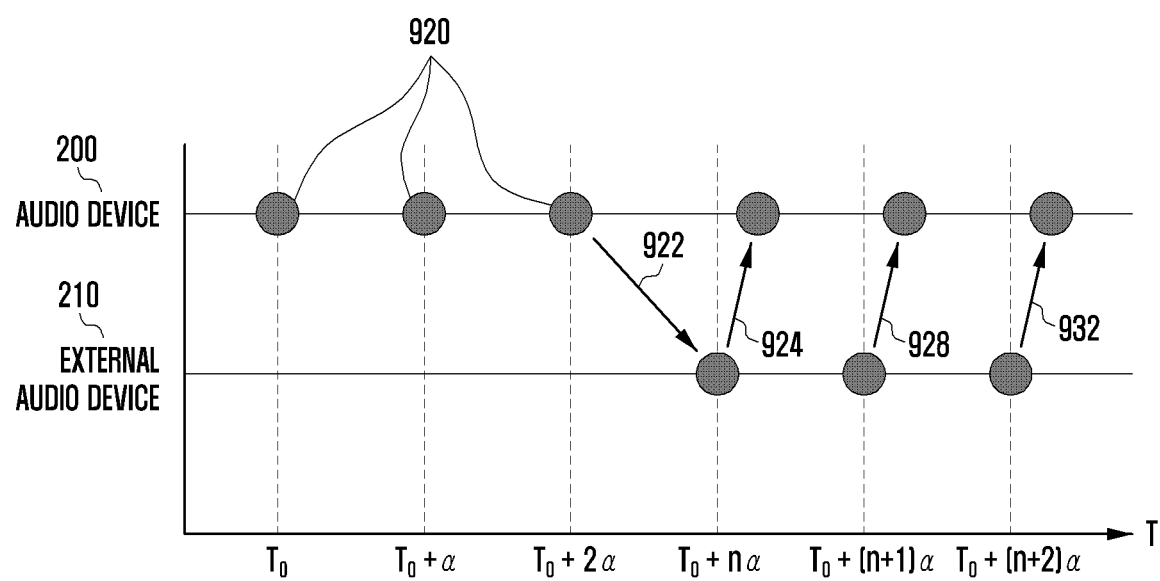
FIG. 9B illustrates another example of identifying noise of another audio device by an audio device according to certain embodiments.

FIG. 9B illustrates another example of identifying noise of another audio device by an audio device according to certain embodiments.

According to certain embodiments referring to FIG. 9B, when noise satisfying a first reference level for a first time interval is detected from the audio device 200 (920), the audio device 200 may periodically identify information related to the noise of the external audio device 210. According to an embodiment, when it is determined based on the noise of the audio device 200 that a designated first condition is satisfied, the audio device 200 may transmit a noise level request signal to the external audio device 210 (922). The external audio device 210 may periodically transmit the information related to the noise of the external audio device 210 to the audio device 200 in response to the noise level request signal (924, 928, and 932). According to an embodiment, when a noise level of the external audio device 210 fails to satisfy a second condition (e.g., does not correspond to a second reference level or lower), the external audio device 210 may not transmit a response to the audio device 200. For example, when no response to the noise level request signal is received from the external audio device 210, the audio device 200 may determine that the external audio device 210 fails to satisfy a second condition.

According to certain embodiments, the external audio device 210 may transmit information related to noise detected based on a designated period through a microphone of the external audio device 210, to the audio device 200. According to an embodiment, when the designated period arrives, the external audio device 210 may transmit information on the noise detected (e.g., a noise level) through the microphone of the external audio device 210, to the audio device 200. According to an embodiment, the external audio device 210 may transmit a result of comparison between the second reference level and the noise detected through the microphone of the external audio device 210, to the audio device 200.

According to an embodiment, when the noise of the external audio device 210 satisfies, based on the noise information received from the external audio device 210, the second reference level for the second time interval, the audio device 200 may identify the intensity of the noise detected through the microphone 322 of the audio device 200. When the intensity (e.g., a noise level) of the noise detected through the microphone 322 satisfies the first reference level for the first time interval, the audio device 200 may determine to perform role switching with the external audio device 210.

Figure 10:
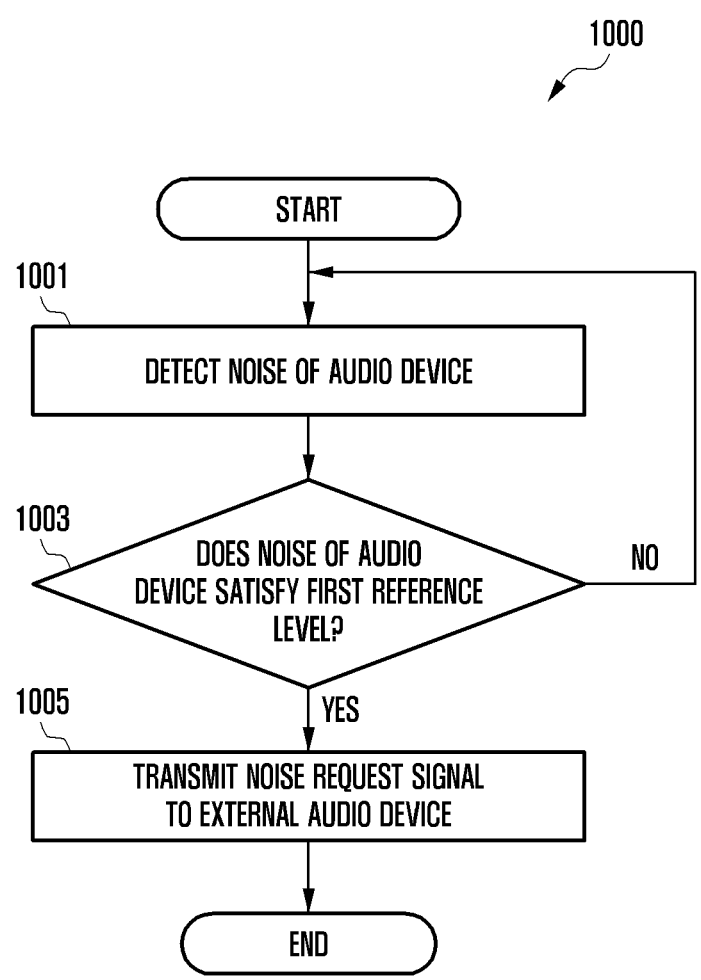
FIG. 10 is a flow chart illustrating transmission of a noise level request signal by an audio device according to certain embodiments.

FIG. 10 is a flow chart 1000 illustrating transmission of a noise level request signal by an audio device according to certain embodiments. According to certain embodiments, operations of FIG. 10 may be detailed operations of operation 807 of FIG. 8. Operations in the following embodiment may be sequentially performed, but are not mandatorily sequentially performed. For example, the sequences of the operations may be changed, and two or more operations may be performed in parallel. For example, the audio device of FIG. 10 may be the electronic device 101 of FIG. 1 or the audio device 200 of FIG. 2 or FIG. 3.

According to certain embodiments referring to FIG. 10, when noise of the external audio device 210 satisfies a second reference level (e.g., if "Yes" in operation 805 of FIG. 8), an audio device (e.g., the processor 120 of FIG. 1 or the processor 310 of FIG. 3) may identify noise of the audio device 200 in operation 1001. According to an embodiment, when a transmission time point of a noise level request signal arrives, the processor 310 may detect noise through the microphone 322. For example, the transmission time point of the noise level request signal may be configured based on a period for identification of noise by the external audio device 210.

According to certain embodiments, the audio device (e.g., the processor 120 or 310) may identify, in operation 1003, whether the noise of the audio device 200 satisfies a first reference level. According to an embodiment, when the intensity of the noise detected from the audio device 200 through the microphone 322 exceeds the first reference level, the processor 310 may determine that the noise of the audio device 200 satisfies the first reference level. According to an embodiment, when the intensity of the noise detected from the audio device 200 through the microphone 322 is equal to or lower than the first reference level, the processor 310 may determine that the noise of the audio device 200 fails to satisfy the first reference level.

According to certain embodiments, when it is determined that the noise of the audio device 200 satisfies the first reference level (e.g., if "Yes" in operation 1003), the audio device (e.g., the processor 120 or 310) may transmit, in operation 1005, a noise level request signal to the external audio device 210. According to an embodiment, when the noise of the audio device 200 satisfies the first reference level, the processor 310 may determine that it is difficult to provide a call function using the microphone 322 of the audio device 200. Accordingly, the processor 310 may control the communication circuit 330 to transmit the noise level request signal to the external audio device 210.

According to certain embodiments, when it is determined that the noise of the audio device 200 fails to satisfy the first reference level (e.g., if "No" in operation 1003), the audio device (e.g., the processor 120 or 310) may identify noise of the audio device 200 in operation 1001. According to an embodiment, when the noise of the audio device 200 fails to satisfy the first reference level, the processor 310 may determine that a call function can be provided using the microphone 322 of the audio device 200. Accordingly, the processor 310 may stop transmitting the noise level request signal. According to an embodiment, when it is determined that the call function can be provided using the microphone 322 of the audio device 200, an operation (e.g., operation 701 of FIG. 7) of determining whether the noise of the microphone 322 of the audio device 200 satisfies the first reference level may be performed.

According to certain embodiments, when a transmission time point of the noise level request signal arrives, the audio device 200 may determine, based on the noise of the audio device 200, whether to transmit the noise level request signal.

Figure 11:
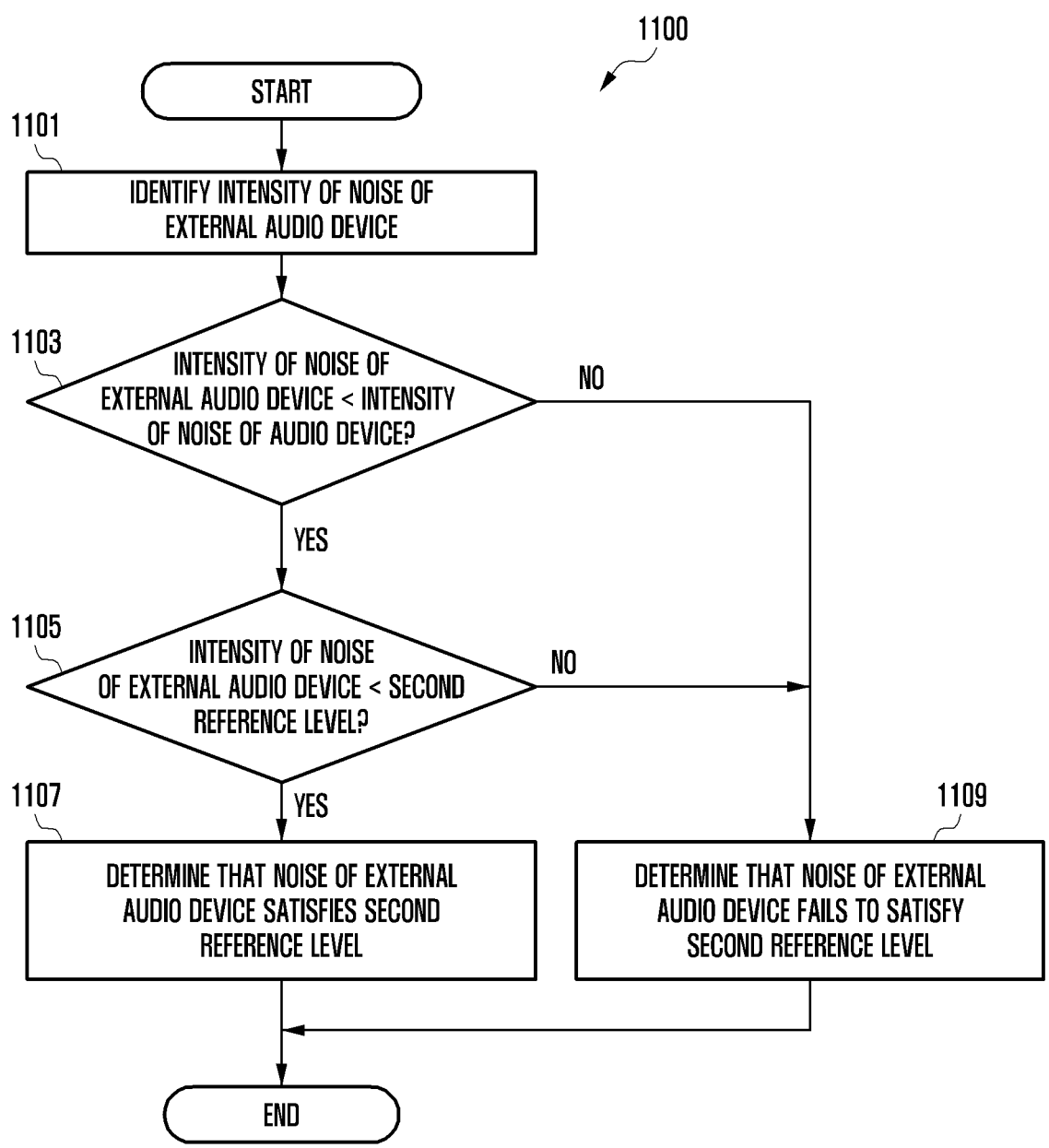
FIG. 11 is a flow chart illustrating identification of noise of another audio device by an audio device according to certain embodiments.

FIG. 11 is a flow chart 1100 illustrating identification of noise of another audio device by an audio device according to certain embodiments. According to an embodiment, operations of FIG. 11 may be detailed operations of operation 805 of FIG. 8. Operations in the following embodiment may be sequentially performed, but are not mandatorily sequentially performed. For example, the sequences of the operations may be changed, and two or more operations may be performed in parallel. For example, the audio device of FIG. 11 may be the electronic device 101 of FIG. 1 or the audio device 200 of FIG. 2 or FIG. 3.

According to certain embodiments referring to FIG. 11, when information related to noise is received from the external audio device 210 (e.g., operation 803 of FIG. 8), an audio device (e.g., the processor 120 of FIG. 1 or the processor 310 of FIG. 3) may identify noise of the external audio device 210 in operation 1101. For example, the intensity of the noise of the external audio device 210 may include the intensity (e.g., a noise level) of noise detected based on a designated period through a microphone of the external audio device 210.

According to certain embodiments, in operation 1103, the audio device (e.g., the processor 120 or 310) may identify whether the intensity of the noise of the external audio device 210 is lower than the intensity of the noise of the audio device 200. According to an embodiment, the processor 310 may detect, based on a designated period, the noise of the audio device 200 through the microphone 322. The processor 310 may compare the intensity of the noise of the external audio device 210 with the intensity of the noise of the audio device 200 detected at a time point closest from a time point at which the noise of the external audio device 210 is detected, among periodically detected noise of the audio device 200. For example, the audio device (e.g., the processor 120 or 310) may identify, based on the intensity of the noise detected from the audio device 200 at a time point at which the intensity of the noise of the external audio device 210 is received or before or after a time point at which the noise of the external audio device 210 is received, whether the noise of the external audio device 210 is lower than the noise of the audio device 200.

According to certain embodiments, when the intensity of the noise of the external audio device 210 is lower than the intensity of the noise of the audio device 200 (e.g., if "Yes" in operation 1103), the audio device (e.g., the processor 120 or 310) may identify, in operation 1105, whether the intensity of the noise of the external audio device 210 is lower than the second reference level. According to an embodiment, when the intensity of the noise of the external audio device 210 is lower than the intensity of the noise of the audio device 200, the processor 310 may determine that the quality of audio data collected through the microphone of the external audio device 210 is relatively better than that of audio data collected through the microphone 322 of the audio device 200. The processor 310 may compare a second reference level with the intensity (e.g., a noise level) of the noise detected from the external audio device 210 to determine whether a call function can be provided using the microphone of the external audio device 210.

According to certain embodiments, when the intensity of the noise of the external audio device 210 is lower than the second reference level (e.g., if "Yes" in operation 1105), the audio device (e.g., the processor 120 or 310) may determine, in operation 1107, that the noise of the external audio device 210 satisfies the second reference level. According to an embodiment, when it is determined that the noise of the external audio device 210 satisfies the second reference level, the processor 310 may identify whether the noise of the external audio device 210 satisfies the second reference level for a designated second time interval (e.g., operations 807 to 809 in FIG. 8).

According to certain embodiments, when the intensity of the noise of the external audio device 210 is equal to or higher than the intensity of the noise of the audio device 200 (e.g., if "No" in operation 1103), or when the noise of the external audio device 210 is equal to or higher than the second reference level (e.g., if "No" in operation 1105), the audio device (e.g., the processor 120 or 310) may determine, in operation 1109, that the noise of the external audio device 210 fails to satisfy the second reference level. According to an embodiment, when it is determined that the noise of the external audio device 210 fails to satisfy the second reference level, the processor 310 may determine that the noise is not concentrated in the audio device 200. The processor 310 may determine that role switching with the external audio device 210 for a communication function is not necessary.

According to certain embodiments, the audio device 200 may identify whether the intensity of the noise of the external audio device 210 is lower than the second reference level. According to an embodiment, when the intensity of the noise of the external audio device 210 is lower than the second reference level, the audio device 200 may identify whether the intensity of the noise of the external audio device 210 is lower than the intensity of the noise of the audio device 200. When the intensity of the noise of the external audio device 210 is lower than the intensity of the noise of the audio device 200, the audio device 200 may determine that the noise of the external audio device 210 satisfies the second reference level. According to an embodiment, when the intensity of the noise of the external audio device 210 is equal to or higher than the second reference level, or when the intensity of the noise of the external audio device 210 is equal to or higher than the intensity of the noise of the audio device 200, the audio device 200 may determine that the noise of the external audio device 210 fails to satisfy the second reference level.

Figure 12:
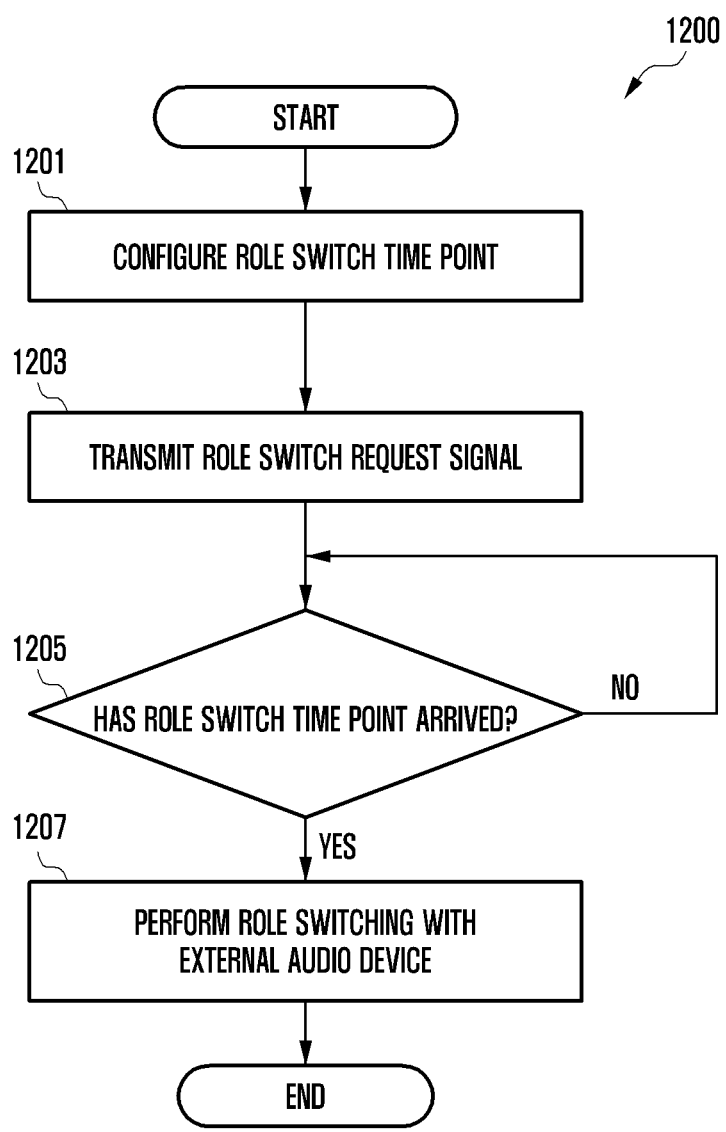
FIG. 12 is a flow chart illustrating role switching in an audio device according to certain embodiments.

FIG. 12 is a flow chart 1200 illustrating role switching in an audio device according to certain embodiments. According to certain embodiments, operations of FIG. 12 may be detailed operations of operation 511 of FIG. 5. Operations in the following embodiment may be sequentially performed, but are not mandatorily sequentially performed. For example, the sequences of the operations may be changed, and two or more operations may be performed in parallel. For example, the audio device of FIG. 12 may be the electronic device 101 of FIG. 1 or the audio device 200 of FIG. 2 or FIG. 3.

According to certain embodiments referring to FIG. 12, when the audio device (e.g., the processor 120 of FIG. 1 or the processor 310 of FIG. 3) determines to perform role switching with the external audio device 210, the audio device may configure a role switch time point in operation 1201. According to an embodiment, when the noise detected from the audio device 200 through the microphone 322 satisfies a designated first condition and the noise of the external audio device 210 satisfies a designated second condition, the processor 310 may determine to perform role switching with the external audio device 210 for a communication function. According to an embodiment, when the role switching with the external audio device 210 is determined to be executed, the processor 310 may configure a role switch time point based on an operation frequency (e.g., clock) of the audio device 200.

According to certain embodiments, the audio device (e.g., the processor 120 or 310) may transmit a role switch request signal including information related to the role switch time point to the external audio device 210 in operation 1203. According to an embodiment, the processor 310 may control the communication circuit 330 to transmit the role switch request signal through the second communication link with the external audio device 210.

According to certain embodiments, the audio device (e.g., the processor 120 or 310) may identify, in operation 1205, when the role switch time point arrives.

According to certain embodiments, when the role switch time point does not arrive (e.g., if "No" in operation 1205), the audio device (e.g., the processor 120 or 310) may continue to monitor, in operation 1205, whether the role switch time point has arrived.

According to certain embodiments, when the role switch time point arrives (e.g., if "Yes" in operation 1205), the audio device (e.g., the processor 120 or 310) may execute role switching with the external audio device 210 in operation 1207. According to an embodiment, the processor 310 may switch the role of the audio device 200 to a secondary device, based on control via the external audio device 210 now set as the primary device.

According to certain embodiments, when the role of the audio device 200 is switched from that of the external audio device 210, the audio device 200 may identify whether role switching is to be periodically performed. For example, the audio device 200 may periodically identify the intensity of the noise received through the microphone 322 of the audio device 200, and request role switching from the external audio device 210 when the intensity of the received noise is equal to or lower than a sixth reference level (e.g., identical to or lower than the second reference level).

According to certain embodiments, when the role of the external audio device 210 is switched from that of the audio device 200, the external audio device 210 may identify whether role switching is to be periodically performed. For example, the external audio device 210 may perform operations in FIG. 7 to perform an operation of identifying whether the noise of the external audio device 210 satisfies the first reference level and identify whether role switching with the audio device 200 is desired.

According to certain embodiments, the audio device 200 may switch the role to the secondary device after transmitting the role switch request signal to the external audio device 210. When receiving the role switch request signal from the audio device 210, the external audio device 210 may switch the role to the primary device.

According to certain embodiments, an operation method of an audio device (e.g., the electronic device 101 of FIG. 1 or the audio device 200 of FIG. 2 or FIG. 3) may include establishing a communication link (e.g., the first communication link 231 of FIG. 2) with an electronic device (e.g., the electronic device 220 of FIG. 2), transmitting information related to the communication link to an external audio device (e.g., the external audio device 210 of FIG. 2), detecting noise of the audio signal, identifying noise of the external audio device when the noise of the audio device satisfies a designated first condition, and controlling the external audio device to transmit audio data to the electronic device when the noise of the external audio device satisfies a designated second condition that is different from the designated first condition.

According to certain embodiments, the method may further include outputting the audio data received from the electronic device to the outside through a speaker of the audio device when a role for communication with the electronic device is configured as a primary device, and transmitting the audio data collected through a microphone of the audio device to the electronic device via the communication link.

According to certain embodiments, the method may further include identifying whether the noise of the audio device satisfies a first reference level for a designated first time interval when the noise of the audio device, detected based on a designated period, satisfies the first reference level, and determining that the designated first condition is satisfied when the noise of the audio device continuously satisfies the first reference level for the designated first time interval.

According to certain embodiments, the first time interval may be configured based on a battery state of the audio device and the noise detected through at least one microphone.

According to certain embodiments, the identifying of the noise of the external audio device may include periodically transmitting a noise level request signal to the external audio device, based on a noise detection period of the external audio device when the noise of the audio device satisfies the designated first condition, and receiving information related to the noise from the external audio device in response to the noise level request signal.

According to certain embodiments, the identifying of the noise of the external audio device may include transmitting a noise level request signal to the external audio device when the noise of the audio device satisfies the designated first condition, and periodically receiving information related to noise of the external audio device from the external audio device.

According to certain embodiments, the method may further include identifying whether the noise of the external audio device satisfies a second reference level for a designated second time interval when the noise of the external audio device satisfies the second reference level, and determining that the designated second condition is satisfied when the noise of the external audio device continuously satisfies the second reference level for the designated second time interval.

According to certain embodiments, the second time interval corresponds to a time interval which is different from or at least partially overlaps a first time interval included in the first designated condition, and may be configured based on a battery state of the external audio device and the noise of the external audio device.

According to certain embodiments, the controlling of the external audio device may include configuring a role switch time point when the noise of the external audio device satisfies the designated second condition, transmitting a role switch request signal including information related to the role switch time point to the external audio device, and switching, based on the role switch time point, a role for communication with the electronic device to a secondary device, in which transmission of audio data to the electronic device by the audio device is restricted based on the role switching, and the external audio device transmits the audio data to the electronic device, based on the role switching.

Certain embodiments disclosed in this specification and the drawings are merely specific examples presented in order to easily describe technical details according to an embodiment of the discourse and to help the understanding of an embodiment of the disclosure, and are not intended to limit the scope of an embodiment of the disclosure. Therefore, all changes or modifications derived from the technical idea of certain embodiments of the disclosure as well as certain embodiments disclosed herein should be construed to fall within the scope of certain embodiments of the disclosure.

What is claimed is:

1. An audio device, comprising:
   at least one microphone;
   a communication circuit; and
   at least one processor operatively connected to the at least one microphone and the communication circuit,
   wherein the processor is configured to:
   establish a communication link with an electronic device via the communication circuit,
   transmit information related to the communication link to an external audio device via the communication circuit,
   detect a first level of noise included in first audio data collected by the at least one microphone,
   if the first level of noise satisfies a predesignated first condition, identify a second level of noise of the external audio device, and
   control the external audio device to transmit second audio data collected by the external audio device to the electronic device, when the second level of noise of the external audio device meets a predesignated second condition different from the predesignated first condition.

2. The audio device of claim 1, further comprising at least one speaker,
   wherein the processor is further configured to:
   receive output audio data from the electronic device via the communication link and output the output audio data using the at least one speaker when the audio device is configured as a primary device, and
   transmit the first audio data to the electronic device via the communication link.

3. The audio device of claim 1, wherein the predesignated first condition includes, for a predesignated period, detecting that the first level of noise at least meets a first reference level continuously through a predesignated first time interval.

4. The audio device of claim 3, wherein the first time interval is based at least on a state of a battery of the audio device, and the first level of noise.

5. The audio device of claim 3, wherein the predesignated first condition includes detecting that the first level of noise exceeds the first reference level.

6. The audio device of claim 3, wherein the processor is further configured to:
   when the second level of noise of the external audio device meets a second reference level, identify whether the second level of noise of the external audio device meets the second reference level continuously for a predesignated second time interval.

7. The audio device of claim 6, wherein the second time interval is different from, or at least partially overlaps, the first time interval, and is based at least in part on a battery state of the external audio device and the second level of noise of the external audio device.

8. The audio device of claim 6, wherein the second reference level includes a level of noise lower than the first reference level.

9. The audio device of claim 1, wherein the processor is further configured to:
   periodically transmit a noise level request signal to the external audio device, based on a noise detection period of the external audio device, when the first level of noise detected through via the at least one microphone satisfies meets the predesignated first condition, and
   receive information related to the second level of noise from the external audio device based on the noise level request signal.

10. The audio device of claim 9, wherein detecting the first level of noise via the at least one microphone is further based on the noise detection period of the external audio device, and
    wherein the noise level request signal is periodically transmitted to the external audio device when the first level of noise meets a first reference level.

11. The audio device of claim 1, wherein the processor is further configured to:
    transmit a noise level request signal to the external audio device when the first level of noise detected via the at least one microphone meets the predesignated first condition, and
    periodically receives information related to the second level of noise from the external audio device.

12. An operation method of an audio device, the method comprising:
    establishing, via a communication circuit of the audio device, a communication link with an electronic device;
    transmitting, via the communication circuit, information related to the communication link to an external audio device;
    detecting, via at least one processor, a first level of noise included in first audio data collected by at least one microphone of the audio device;
    if the first level of noise satisfies a predesignated first condition, identifying a second level of noise of the external audio device; and
    controlling the external audio device to transmit second audio data collected by the external audio device to the electronic device when the second level of noise of the external audio device meets a predesignated second condition different from the predesignated first condition.

13. The method of claim 12, further comprising:
receiving output audio data from the electronic device and outputting the output audio data through a speaker of the audio device, when the audio device is configured as a primary device, and
transmitting the first audio data to the electronic device via the communication link.

14. The method of claim 12, wherein the predesignated first condition includes detecting, for a predesignated time period, that the first level of noise at least meets a first reference level continuously through a predesignated first time interval.

15. The method of claim 14, wherein the first time interval is based at least on a state of a battery of the audio device, and the first level of noise.

16. The method of claim 14, further comprising:
when the second level of noise of the external audio device meets a second reference level, identifying whether the second level of noise of the external audio device meets the second reference level continuously for a predesignated second time interval.

17. The method of claim 16, wherein the second time interval is entirely different from, or at least partially overlaps, the first time interval, and is based at least in part on a battery state of the external audio device and the second level of noise.

18. The method of claim 12, wherein identifying the second level of noise of the external audio device further includes:
when the first level of noise meets the predesignated first condition, periodically transmitting a noise level request signal to the external audio device, based on a noise detection period of the external audio device; and
receiving information related to the second level of noise from the external audio device based on the noise level request signal.

19. The method of claim 12, wherein identifying the second level of noise of the external audio device further includes transmitting a noise level request signal to the external audio device when the first level of noise of the audio device meets the predesignated first condition, and
periodically receiving transmission of information related to second level of noise of the external audio device from the external audio device.

20. The method of claim 12, further comprising:
when the first level of noise satisfies the predesignated second condition, setting, by the at least one processor, a time point at which to execute a role switch,
transmitting a role switch request signal including information related to the set time point to the external audio device, and
switching, based on detecting arrival of the set time point, a configuration of the audio device from a primary device to a secondary device, and the external audio device from the secondary device to the primary device,
wherein transmission of audio data to the electronic device by the audio device is restricted when the audio device is set as the secondary device, and the external audio device receives the audio data from the electronic device based on the switch.

* * * * *